US011800421B2

(12) United States Patent
Kim et al.

(10) Patent No.: US 11,800,421 B2
(45) Date of Patent: Oct. 24, 2023

(54) ELECTRONIC DEVICE FOR REDUCING POWER CONSUMPTION AND OPERATING METHOD THEREOF

(71) Applicant: Samsung Electronics Co., Ltd., Suwon-si (KR)

(72) Inventors: Heetae Kim, Suwon-si (KR); Kyejeong Jeong, Suwon-si (KR); Jungtae Kim, Suwon-si (KR); Sungyong Bang, Suwon-si (KR); Inhwan Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/739,659

(22) Filed: May 9, 2022

(65) Prior Publication Data

US 2022/0264409 A1 Aug. 18, 2022

Related U.S. Application Data

(63) Continuation of application No. 17/227,952, filed on Apr. 12, 2021, now Pat. No. 11,388,641, which is a
(Continued)

(30) Foreign Application Priority Data

Aug. 6, 2019 (KR) .................. 10-2019-0095655

(51) Int. Cl.
*H04W 36/16* (2009.01)
*H04W 36/00* (2009.01)
(Continued)

(52) U.S. Cl.
CPC ....... *H04W 36/16* (2013.01); *H04W 36/0022* (2013.01); *H04W 36/24* (2013.01);
(Continued)

(58) Field of Classification Search
None
See application file for complete search history.

(56) References Cited

U.S. PATENT DOCUMENTS 5,800,947 A 9/1998 Kohler et al.
2010/0273486 A1 10/2010 Kharia et al.
(Continued)

FOREIGN PATENT DOCUMENTS

CN 104272857 A 1/2015
EP 3 114 878 1/2017
(Continued)

OTHER PUBLICATIONS

Russian Office Action with English translation dated May 27, 2022; Russian Appln. No. 2021134047.
(Continued)

*Primary Examiner* — Diane L Lo
(74) *Attorney, Agent, or Firm* — Jefferson IP Law, LLP

(57) ABSTRACT

A device and a method for reducing power consumption of an electronic device is provided. The electronic device includes a display device, a battery, and at least one processor configured to be operatively connected to the display device, wherein the processor may determine whether to perform a handover to a second communication network, based on whether the display device is activated and a data throughput, in a state of connection to a first communication network among a plurality of communication networks supportable by the electronic device, and perform a handover to the second communication network when it is determined to perform the handover to the second communication network.

19 Claims, 19 Drawing Sheets

Related U.S. Application Data continuation of application No. 16/983,605, filed on Aug. 3, 2020, now Pat. No. 10,979,952.

(51) Int. Cl.
*H04W 36/24* (2009.01)
*H04W 36/36* (2009.01)
*H04W 52/02* (2009.01)
*H04W 88/06* (2009.01)

(52) U.S. Cl.
CPC ....... *H04W 36/36* (2013.01); *H04W 52/0258* (2013.01); *H04W 88/06* (2013.01)

(56) References Cited

U.S. PATENT DOCUMENTS

| | | |
|---|---|---|
| 2011/0149764 A1 | 6/2011 | Wietfeldt et al. |
| 2012/0142358 A1 | 6/2012 | Ishihara |
| 2013/0210415 A1 | 8/2013 | Mathias et al. |
| 2013/0210481 A1* | 8/2013 | Sane ............... H04W 48/18 455/552.1 |
| 2015/0016323 A1 | 1/2015 | Sundararajan et al. |
| 2015/0030905 A1 | 1/2015 | Mizuno et al. |
| 2015/0181531 A1 | 6/2015 | Zajac |
| 2015/0228949 A1 | 8/2015 | Mizuno et al. |
| 2015/0257066 A1 | 9/2015 | Salkintzis |
| 2016/0192237 A1 | 6/2016 | Joung et al. |
| 2016/0192290 A1 | 6/2016 | Joung et al. |
| 2016/0295515 A1 | 10/2016 | Cai et al. |
| 2017/0111187 A1 | 4/2017 | Zanier et al. |
| 2017/0302786 A1 | 10/2017 | Han |
| 2019/0059051 A1 | 2/2019 | Astrom et al. |
| 2019/0082395 A1 | 3/2019 | Malladi et al. |
| 2019/0141767 A1 | 5/2019 | Wang et al. |
| 2019/0166536 A1 | 5/2019 | Kim et al. |
| 2019/0320483 A1* | 10/2019 | Palat ............... H04W 76/19 |
| 2019/0349821 A1 | 11/2019 | Kim |
| 2019/0364462 A1 | 11/2019 | Kim et al. |
| 2020/0100181 A1 | 3/2020 | Jia et al. |
| 2020/0322854 A1 | 10/2020 | Ryoo et al. |
| 2020/0351792 A1* | 11/2020 | Ghelichi ................ H04L 43/16 |

FOREIGN PATENT DOCUMENTS

| | | |
|---|---|---|
| KR | 10-0315370 B1 | 8/2002 |
| KR | 10-1423103 B1 | 7/2014 |
| KR | 10-1423104 B1 | 7/2014 |
| KR | 10-1567036 B1 | 11/2015 |
| KR | 10-1600282 B1 | 3/2016 |
| KR | 10-1602328 B1 | 3/2016 |
| KR | 10-1789431 B1 | 10/2017 |
| KR | 10-2017-0132687 A | 12/2017 |
| KR | 10-1816799 B1 | 1/2018 |
| KR | 10-2018-0093454 A | 8/2018 |
| KR | 10-2018-0108493 A | 10/2018 |
| KR | 10-1977615 B1 | 5/2019 |
| RU | 2 691 640 C2 | 6/2019 |
| WO | 2015/134624 A1 | 9/2015 |

OTHER PUBLICATIONS

Russian Search Report with English translation dated May 26, 2022; Russian Appln. No. 2021134047.
3GPP; 3rd Generation Partnership Project; Technical Specification Group Radio Access Network; NR; Radio Resource Control (RRC) protocol specification (Release 15); 3GPP TS 38.331; V15.6.0; Jun. 2019; pp. 1-521; Valbonne, France.
Zhang et al.; AHT; Application-Based Handover Triggering for Saving Energy in Cellular Networks; IEEE; pp. 1-9; Jun. 11, 2018.
International Search Report dated Nov. 17, 2020; International Appln. No. PCT/KR2020/010182.
European Search Report dated Jan. 20, 2021; European Appln. No. 20189642.0-1205 / 3780769.
Chinese Office Acton with English translation dated Sep. 1, 2021; Chinese Appln. No. 202010776567.3.
Chinese Office Action with English translation dated Aug. 24, 2022; Chinese Appln. No. 202010776567.3.
European Search Report dated Aug. 26, 2022; European Appln. No. 22174701.7-1206.
European Search Report dated Sep. 7, 2022; European Appln. No. 22 174 701.7-1206.
Russian Office Action with English translation dated Feb. 1, 2023; Russian Appln. No. 2021134047.

* cited by examiner

ELECTRONIC DEVICE FOR REDUCING POWER CONSUMPTION AND OPERATING METHOD THEREOF

CROSS-REFERENCE TO RELATED APPLICATION(S)

This application is a continuation application of prior application Ser. No. 17/227,952, filed on Apr. 12, 2021, which is a continuation application of prior application Ser. No. 16/983,605, filed on Aug. 3, 2020, which has issued as U.S. Pat. No. 10,979,952 on Apr. 13, 2021 and is based on and claims priority under 35 U.S.C. § 119(a) of a Korean patent application number 10-2019-0095655, filed on Aug. 6, 2019, in the Korean Intellectual Property Office, the disclosure of which is incorporated by reference herein in its entirety.

BACKGROUND

1. Field

The disclosure relates to a device and a method for reducing power consumption due to wireless communication in an electronic device.

2. Description of Related Art

Electronic devices use a battery as a power source for portability and mobility for a user. A battery has a limited storage capacity. Thus, electronic devices may be used for a limited time use due to the limited storage capacity of a battery.

A method for increasing the use time of an electronic device is increasing the storage capacity of a battery or reducing the power consumption of the electronic device. Since the storage capacity of a battery is proportional to the size and weight of the battery, there may be limitations in increasing the storage capacity of a battery. Accordingly, electronic devices need a method for reducing the power consumption of an electronic device in order to increase the use time.

The above information is presented as background information only to assist with an understanding of the disclosure. No determination has been made, and no assertion is made, as to whether any of the above might be applicable as prior art with regard to the disclosure.

SUMMARY

In order to meet users' demand for wireless data traffic, 5th-generation (5G) communication utilizes a 6 GHz band or lower (e.g., a 1.8 GHz band or 3.5 GHz band) or an extremely high frequency (mmWave) band (e.g., a 28 GHz band or 39 GHz band), thereby achieving a high data transmission rate.

When an electronic device is connected to a 5G network, power consumption due to wireless communication may be increased compared to when connecting to a 4th-generation (4G) network (e.g., a long-term evolution (LTE) network). Accordingly, an electronic device that connects to a 5G network and performs wireless communication may cause a decrease in the use time of a battery having a limited storage capacity.

Aspects of the disclosure are to address at least the above-mentioned problems and/or disadvantages and to provide at least the advantages described below. Accordingly, an aspect of the disclosure is to provide a device and a method for reducing power consumption due to wireless communication in an electronic device.

Additional aspects will be set forth in part in the description which follows and, in part, will be apparent from the description, or may be learned by practice of the presented embodiments.

In accordance with an aspect of the disclosure, an electronic device is provided. The electronic device includes a display device, a battery, and at least one processor operatively connected to the display device, wherein the processor is configured to determine whether to perform a handover to a second communication network, based on whether the display device is activated and a data throughput, in a state of connection to a first communication network among a plurality of communication networks supportable by the electronic device, and perform a handover to the second communication network when it is determined to perform the handover to the second communication network.

In accordance with another aspect of the disclosure, an operating method of an electronic device is provided. The operating method includes connecting to a first communication network among a plurality of communication networks supportable by the electronic device, determining whether to perform a handover to a second communication network, based on whether a display device is activated and a data throughput, in a state of connection to the first communication network, and performing a handover to the second communication network when it is determined to perform the handover to the second communication network.

In accordance with another aspect of the disclosure, an electronic device is provided. The electronic device includes a display device, a battery, and at least one processor operatively connected to the display device, wherein the processor is configured to connect to a first communication network, based on control information obtained through a second communication network among a plurality of communication networks supportable by the electronic device, determine whether to use the first communication network, based on whether the display device is activated and a data throughput, in a state of connection to the first communication network, identify whether there is data transmitted and received through the first communication network when it is determined that use of the first communication network is restricted, and restrict a data channel request to the first communication network in a state of connection to the second communication network when there is no data transmitted and received through the first communication network.

According to various embodiments of the disclosure, an electronic device may select a network for data transmission, based on at least one of whether a display device is activated, a data throughput, an application program being executed, the charge state of a battery, or whether an external power source is connected, thereby reducing power consumption due to wireless communication and thus extending the use time of the battery.

According to various embodiments, an electronic device may adaptively set a criterion for network selection per user, based on the use pattern of the electronic device per user, thereby providing an optimal battery use time for each user.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages, of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following description, terms for referring to network entities, terms referring to interfaces between network entities, and the like are illustratively used for the sake of convenience. Therefore, the disclosure is not limited by the terms as used below, and other terms referring to subjects having equivalent technical meanings may be used.

As used herein, a first communication network may include a new radio (NR) network (or 5G network) using a frequency in a high-frequency band (mmWave), and a second communication network may include a legacy network, such as a long-term evolution (LTE) network (or 4G network), a wideband code division multiplexing access (WCDMA) network, or the like. However, the first communication network and the second communication network are not limited to the above examples but may include networks according to different communication technologies. For example, wireless communication using the first communication network may have higher power consumption due to wireless communication than wireless communication using the second communication network.

Figure 1:
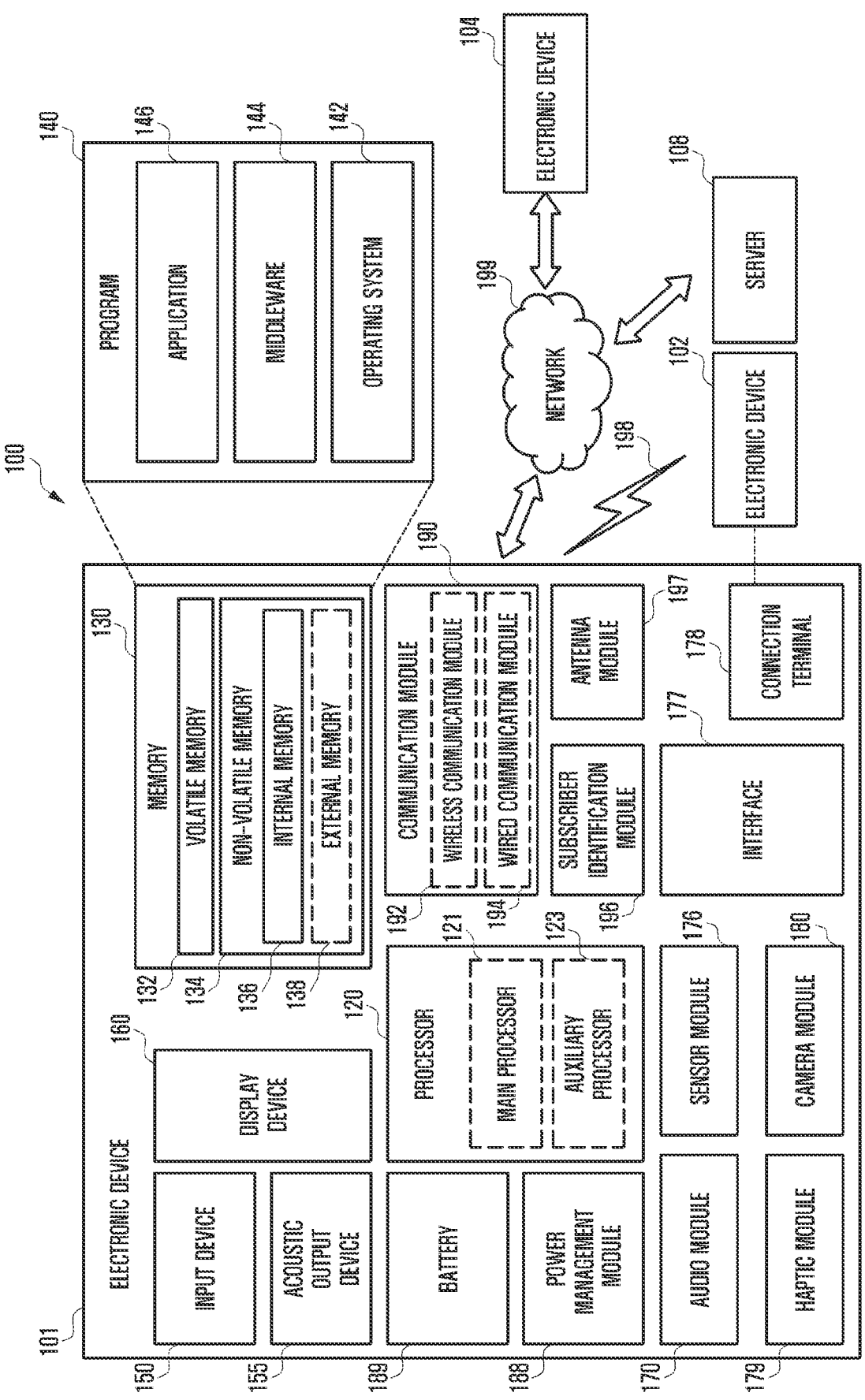
FIG. 1 is a block diagram illustrating an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an example embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an example embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and does not include a signal (e.g., an electromagnetic wave), but this term may not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
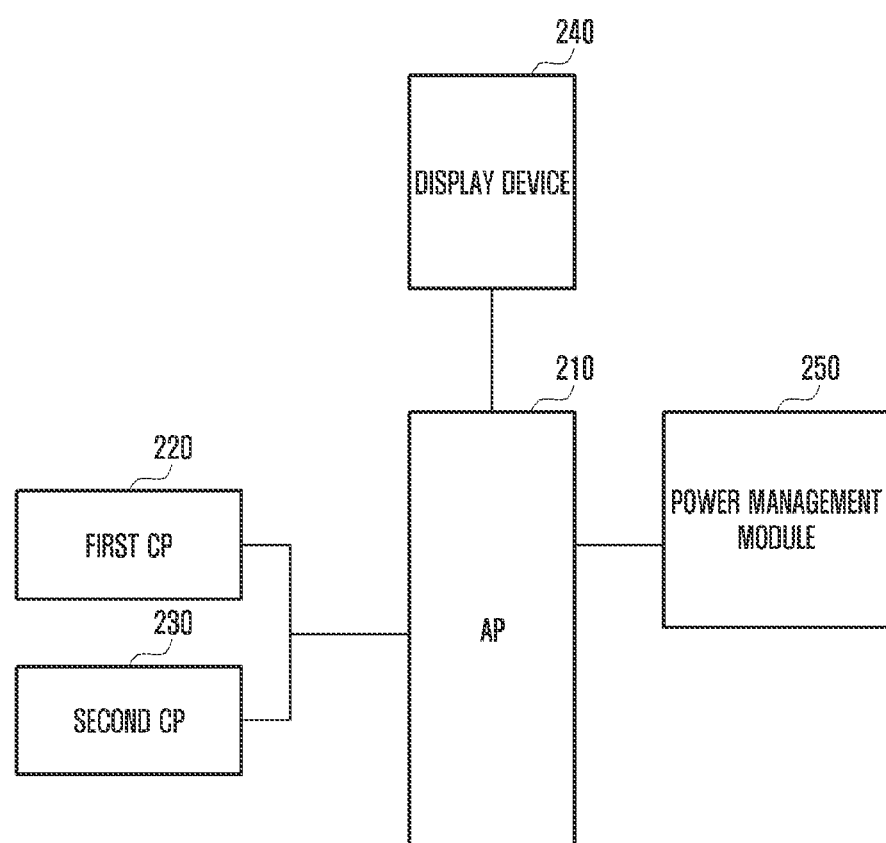
FIG. 2 is a block diagram illustrating an electronic device for controlling a handover according to an embodiment of the disclosure.

FIG. 2 is a block diagram illustrating an electronic device 101 for controlling a handover according to an embodiment of the disclosure.

Referring to FIG. 2, the electronic device 101 may include an application processor (AP) 210, communication processors (CP) 220 and 230, a display device 240, and a power management module 250. The application processor (AP) 210 may be substantially the same as the main processor 121 of FIG. 1 or may be included in the main processor 121. The communication processors (CPs) 220 and 230 may be substantially the same as the auxiliary processor 123 (or coprocessor) of FIG. 1 or may be included in the auxiliary processor 123 (or coprocessor). The display device 240 may be substantially the same as the display device 160 of FIG. 1 or may be included in the display device 160. The power management module 250 may be substantially the same as the power management module 188 of FIG. 1 or may be included in the power management module 188.

The application processor 210 may select a network for wireless communication, based on at least one of whether the display device 240 is activated, the data throughput of the electronic device 101, whether an application program associated with a first communication network is executed, the state of charge (SoC) of a battery 189, or whether an external power source is connected.

When the display device 240 is switched to an inactive state with the electronic device 101 connected to the first communication network, the application processor 210 may control a first communication processor 220 and/or a second communication processor 230 to hand over the electronic device 101 to a second communication network. For example, when the first communication network is configured in a non-standalone (NSA) mode, the application processor 210 may transmit a message for requesting a handover to the second communication network to the second communication processor 230. The second communication processor 230 may perform a handover from a first communication network connection state to a second communication network connection state according to the request from the application processor 210. Although not shown in the drawing, the first communication processor 220 and the second communication processor 230 may be connected via a separate interface (e.g., a UART interface or the like) that does not pass through the application processor 210. In another example, when the first communication network is configured in a standalone (SA) mode, the application processor 210 may transmit a message for requesting a handover to the second communication network to the first communication processor 220 and the second communication processor 230. For example, when the display device 240 remains in the inactive state for a reference time period, the application processor 210 may determine that the display device 240 is switched to the inactive state.

When the display device 240 is switched to the inactive state with the electronic device 101 connected to the first communication network and the data throughput of the electronic device 101 is lower than a reference throughput, the application processor 210 may control the first communication processor 220 and/or the second communication processor 230 to hand the electronic device 101 over to the second communication network. For example, the data throughput of the electronic device 101 may be periodically detected by the application processor 210 with the display device 240 being in the inactive state.

When the display device 240 is switched to the inactive state with the electronic device 101 connected to the first communication network and an application program associated with the first communication network is not executed, the application processor 210 may control the first communication processor 220 and/or the second communication processor 230 to hand the electronic device 101 over to the second communication network. When the application program associated with the first communication network is being executed with the display device 240 switched to the inactive state but the data throughput of the electronic device 101 is lower than the reference throughput, the application processor 210 may control the first communication processor 220 and/or the second communication processor 230 to hand over the electronic device 101 to the second communication network. When the application program associated with the first communication network is being executed with the display device 240 switched to the inactive state and the data throughput of the electronic device 101 is equal to or higher than the reference throughput, the application processor 210 may control the first communication processor 220 and/or the second communication processor 230 to maintain the connection to the first communication network.

The application processor 210 may determine whether to perform a handover to the second communication network, based on at least one of the state of charge (SoC level) of the battery 189 or whether an external power source is connected when the electronic device 101 is connected to the first communication network. For example, when the state of charge (SoC level) of the battery 189 is higher than a reference level or an external power source is connected, the application processor 210 may determine whether to perform a handover to the second communication network, based on at least one of whether the display device 240 is active, whether the application program associated with the first communication network is executed, or the data throughput of the electronic device 101. For example, when the state of charge (SoC level) of the battery 189 is lower than the reference level or no external power source is connected, the application processor 210 may control the first communication processor 220 and/or the second communication processor 230 to hand over the electronic device 101 to the second communication network.

When the display device 240 is switched to the active state with the electronic device 101 handed over to the second communication network, the application processor 210 may control the first communication processor 220 and/or the second communication processor 230 to hand over the electronic device 101 to the first communication network. For example, when the first communication network is configured in the non-standalone (NSA) mode, the application processor 210 may transmit a message for requesting a handover to the first communication network to the second communication processor 230. For example, when the first communication network is configured in the standalone (SA) mode, the application processor 210 may transmit a message for requesting a handover to the first communication network to the first communication processor 220 and the second communication processor 230.

When the display device 240 is switched to the active state with the electronic device 101 handed over to the second communication network and the data throughput of the electronic device 101 is equal to or higher than the reference throughput, the application processor 210 may control the first communication processor 220 and/or the second communication processor 230 to hand over the electronic device 101 to the first communication network.

When the display device 240 is switched to the active state with the electronic device 101 handed over to the second communication network and the application program associated with the first communication network is executed, the application processor 210 may control the first communication processor 220 and/or the second communication processor 230 to hand over the electronic device 101 to the first communication network.

The application processor 210 may determine whether to perform a handover to the first communication network, based on at least one of the state of charge (SoC level) of the battery 189 or whether an external power source is connected. For example, the state of charge (SoC level) of the battery 189 is higher than the reference level or an external power source is connected, the application processor 210 may control the first communication processor 220 and/or the second communication processor 230 to perform a handover to the first communication network. For example, when the state of charge (SoC level) of the battery 189 is lower than the reference level or no external power source is connected, the application processor 210 may control the first communication processor 220 and/or the second communication processor 230 to maintain the connection to the second communication network.

The application processor 210 may adaptively set reference information (e.g., a reference level, a reference throughput, or the like) for handover of the electronic device 101, based on a use pattern of each user with respect to the electronic device 101. The application processor 210 may set the use pattern of the user with respect to the electronic device 101 in view of at least one of data usage per user of the electronic device 101, a data throughput, the use frequency of an application program, or application program use time collected for a certain time period. The application processor 210 may set (or update) reference information for network switching, based on the use pattern of the user with respect to the electronic device 101. The application processor 210 may transmit at least one of the data usage per user of the electronic device 101, the data throughput of the electronic device 101, the use frequency of the application program, or the application program use time collected for the certain time period to a server. The application processor 210 may receive per-user reference information for network switching from the server.

The application processor 210 may adaptively apply the reference information (e.g., the reference level, the reference throughput, or the like) for the handover of the electronic device 101, based on at least one of the user, position, or use time point of the electronic device 101.

The application processor 210 may detect the data throughput of the electronic device 101, based on the amount of data (or packet) transmitted and received through the communication processors 220 and 230. The first communication processor 220 and the second communication processor 230 may provide the amount of data (or packets) transmitted and received through each communication network to the application processor 210. The application processor 210 may identify (or estimate) the data throughput of the electronic device 101, based on the amount of data transmitted and received through each communication network, provided from the communication processors 220 and 230. For example, the application processor 210 may periodically (e.g., every 10 seconds) identify the data throughput of the electronic device 101 with the display device 240 being in the inactive state.

The first communication processor 220 may control transmission and reception of data through the first communication network. The second communication processor 230 may control transmission and reception of data through the second communication network. When the first communication network is configured in the non-standalone (NSA) mode, the first communication processor 220 may provide a service through the first communication network by interworking with the second communication processor 230. For example, when the electronic device 101 wishes to connect to the first communication network, the second communication processor 230 may establish a control channel associated with the first communication network through the second communication network. The first communication processor 220 may establish a data channel through the first communication network, based on the control channel associated with the first communication network established through the second communication network and may provide a service through the first communication network. When the first communication network is configured in the standalone (SA) mode, the first communication processor 220 may provide a service through the first communication network alone.

When the first communication network is configured in the standalone (SA) mode, the first communication processor 220 may control the second communication processor 230 to hand over a communication network of the electronic device 101 according to a handover request from the application processor 210. For example, the first communication processor 220 may provide time for a handover to the second communication network to the second communication processor 230, based on the operating state of the first communication network.

When the application processor 210 determines a handover to the second communication network, based on first state information, the first communication processor 220 may control the second communication processor 230 to perform a handover to the second communication network at a time when there is no data transmitted and received through the first communication network. In one example, when there is no data transmitted and received through the first communication network at a time of receiving a handover request from the application processor 210, the first communication processor 220 may control the second communication processor 230 to perform a handover to the second communication network. In another example, when there is data transmitted and received through the first communication network at a time of receiving a handover request from the application processor 210, the first communication processor 220 may delay a handover to the second communication network until transmission and reception of the data through the first communication network is completed. When transmission and reception of the data through the first communication network is completed, the first communication processor 220 may control the second communication processor 230 to perform a handover to the second communication network. When there is no data transmitted and received through the first communication network for a certain time period (e.g., 10 minutes), the first communication processor 220 may control the second communication processor 230 to perform a handover to the second communication network. The first communication processor 220 may control time for the second communication processor 230 to perform a handover to the second communication network, based on whether there is data transmitted and received through the first communication network. For example, the first state information may include at least one of whether the display device 240 is active, an application program being executed, or a data throughput.

When the application processor 210 determines a handover to the second communication network, based on information about the state of charge of the battery, the first communication processor 220 may perform disconnection from the first communication network. The first communication processor 220 may perform disconnection from the first communication network, based on a handover request from the application processor 210, regardless of whether there is data transmitted and received through the first communication network. For example, the first communication processor 220 may transmit a disconnection request message to the first communication network, based on the handover request from the application processor 210. When a communication channel with the first communication network is released based on the disconnection request message, the first communication processor 220 may transmit information about completion of disconnection from the first communication network to the second communication processor 230.

When receiving a message for requesting a handover to the second communication network from the application processor 210, the second communication processor 230 may establish a communication channel with the second communication network. For example, the application processor 210 determines a handover to the second communication network, based on the first state information, the second communication processor 230 may establish a communication channel with the second communication network, based on handover control information provided from the first communication processor 220. The handover control information may include information about time to perform a handover determined based on whether there is data transmitted/received through the first communication network. For example, when receiving a message for requesting a handover to the second communication network determined based on the state of charge of the battery from the application processor 210, the second communication processor 230 may establish a communication channel with the second communication network.

When the first communication network is configured in the non-standalone mode (NSA), the second communication processor 230 may restrict a data channel request to the first communication network.

When the application processor 210 determines to perform a handover to the second communication network, based on a first state parameter, the second communication processor 230 may restrict a data channel request to the first communication network at a time when there is no data transmitted/received through the first communication network. For example, when the application processor 210 requests a handover, the second communication processor 230 may identify whether there is data transmitted/received through the first communication network. The second communication processor 230 may identify whether there is data transmitted/received through the first communication network, by using the first communication processor 220. When there is no data transmitted/received through the first communication network, the second communication processor 230 may control the first communication processor 220 to restrict a data channel request to the first communication network. For example, when there is data transmitted and received through the first communication network when the application processor 210 requests a handover, the second communication processor 230 may identify whether data transmission and reception through the first communication network is completed. When the data transmission and reception through the first communication network is completed, the second communication processor 230 may control the first communication processor 220 to restrict a data channel request to the first communication network. Here, a control channel with the second communication network may be maintained. When there is no data transmitted and received through the first communication network for a certain time period (e.g., 10 minutes), the second communication processor 230 may control the first communication processor 220 to restrict a data channel request to the first communication network. For example, when restricting the data channel request to the first communication network, the second communication processor 230 may establish a data channel with the second communication network and may transmit and receive data through the second communication network (e.g., fall back to the second communication (4G) network).

When the application processor 210 determines to perform a handover to the second communication network, based on the information about the state of charge of the battery, the second communication processor 230 may control the first communication processor 220 to release the data channel with the first communication network. The first communication processor 220 may transmit a disconnection request message to the first communication network, based on control of the second communication processor 230. When the data channel with the first communication network is released, the first communication processor 220 may restrict a data channel request to the first communication network. Here, the control channel with the second communication network established using the second communication processor 230 may be maintained.

The display device 240 may display information about driving of the electronic device 101. For example, the display device 240 may be activated or deactivated based on control of the application processor 210. In one example, the display device 240 may provide information about an operating state (e.g., an active state or an inactive state) of the display device 240 to the application processor 210. The information about the operating state may be transmitted periodically or when the operating state of the display device 240 is changed.

The power management module 250 may provide the information about the state of charge of the battery 189 to the application processor 210. For example, the information about the state of charge of the battery 189 may be provided to the application processor 210 periodically or at a time when the charge state level of the battery 189 is changed. The power management module 250 may manage charging of the battery 189 using an external power source connected by at least one of wired or wireless charging methods. The power management module 250 may provide information about connection of the external power source to the application processor 210. The information about the connection of the external power source may be provided to the application processor 210 when the external power source is connected to the electronic device 101 or when the external power source is disconnected.

At least one of the application processor 210 or the communication processors 220 and 230 may be configured as a single chip. According to an embodiment, the application processor 210 and the communication processors 220 and 230 may be configured as a single chip. The communication processors 220 and 230 may be configured as a single chip. The configuration and structure of the communication processor(s) supporting the first communication network and the second communication network are not limited to the above examples, and different configurations and structures may be supported for the communication processor supporting the first communication network and the second communication network.

According to various embodiments of the disclosure, an electronic device 101 may include a display device 160; a battery 189; and at least one processor 120 configured to be operatively connected to the display device 160, wherein the processor 120 may determine whether to perform a handover to a second communication network, based on whether the display device 160 is activated and a data throughput, in a state of connection to a first communication network among a plurality of communication networks supportable by the electronic device 101, and may perform a handover to the second communication network when it is determined to perform the handover to the second communication network.

The processor 120 may determine to perform the handover to the second communication network when the display device 160 is deactivated and the data throughput is lower than a reference throughput.

The reference throughput may be set based on a use pattern of a user with respect to the electronic device 101, and the use pattern may be set based on at least one of a data usage per user collected for a reference time period, the data throughput, a use frequency of an application program, or an application program use time.

The processor 120 may identify whether there is data transmitted and received through the first communication network when it is determined to perform the handover to the second communication network, may identify whether transmission and reception of data through the first communication network is completed when there is the data transmitted and received through the first communication network, and may perform the handover to the second communication network when the transmission and reception of the data through the first communication network is completed.

The processor 120 may identify the state of charge (SoC) of the battery 189, and may perform the handover to the second communication network when the SoC of the battery 189 is lower than a reference level.

The processor 120 may determine whether to perform the handover to the second communication network, based on whether the display device 160 is activated and the data throughput, when the SoC of the battery 189 is equal to or higher than the reference level.

The reference level may be set based on a use pattern of a user with respect to the electronic device 101, and the use pattern may be set based on at least one of a data usage per user collected for a reference time period, the data throughput, a use frequency of an application program, or an application program use time.

The processor 120 may perform a handover to the first communication network when the display device is activated in a state of connection to the second communication network based on deactivation of the display device.

The first communication network may include a new radio (NR) communication network, and the second communication network may include a long-term evolution (LTE) communication network.

According to various embodiments of the disclosure, an electronic device 101 may include a display device 160; a battery 189; and at least one processor 120 configured to be operatively connected to the display device 160. The processor 120 may connect to a first communication network, based on control information obtained through a second communication network among a plurality of communication networks supportable by the electronic device 101, may determine whether to use the first communication network, based on whether the display device 160 is activated and a data throughput, in a state of connection to the first communication network, may identify whether there is data transmitted and received through the first communication network when it is determined that use of the first communication network is restricted, and may restrict a data channel request to the first communication network in a state of connection to the second communication network when there is no data transmitted and received through the first communication network.

The processor 120 may identify the state of charge (SoC) of the battery, may transmit a message associated with a disconnection to the first communication network when the state of charge of the battery 189 is lower than a reference level, and may restrict the data channel request to the first communication network in the state of connection to the second communication network when disconnected from the first communication network.

Figure 3:
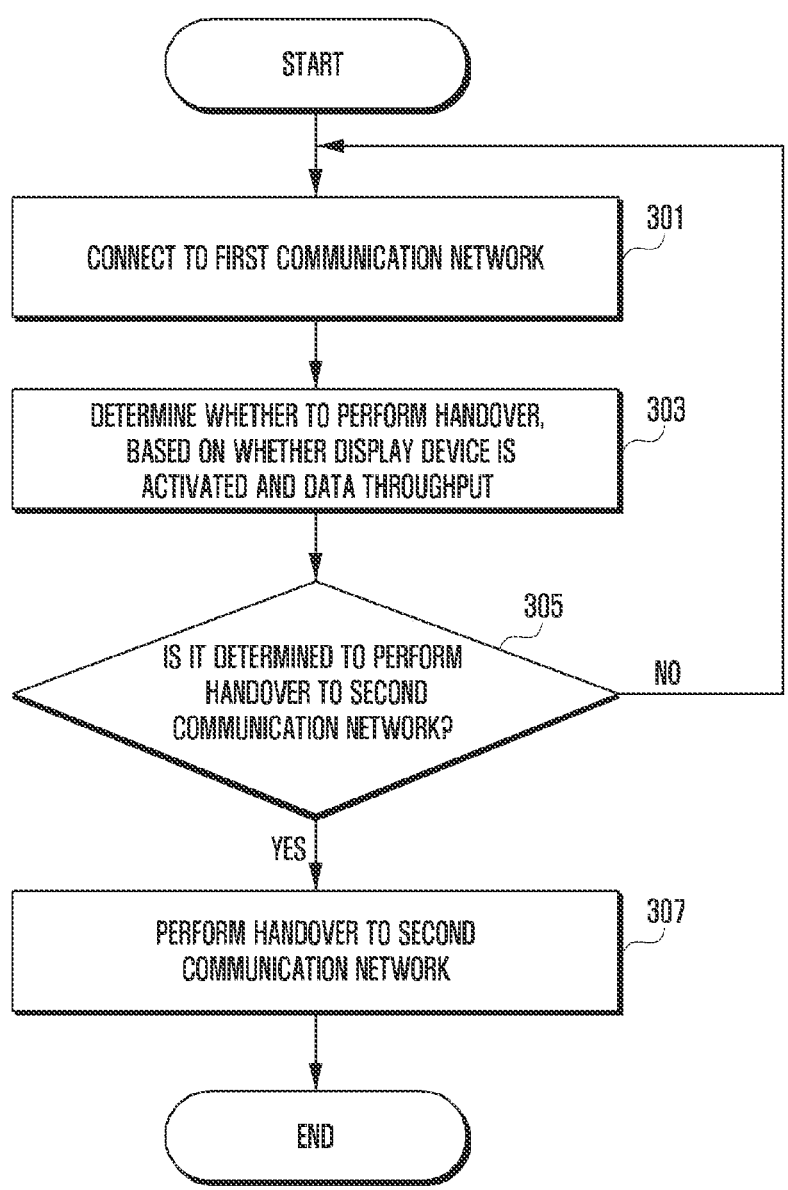
FIG. 3 is a flowchart showing that an electronic device performs a handover to a second communication network, based on the state of a display device and a data throughput according to an embodiment of the disclosure.

FIG. 3 is a flowchart 300 showing that an electronic device performs a handover to a second communication network, based on the state of a display device and a data throughput according to an embodiment of the disclosure.

In the following description, individual operations may be performed sequentially but are not necessarily performed sequentially. For example, the order of individual operations may be changed, and at least two operations may be performed in parallel. The electronic device may be the electronic device 101 of FIG. 1 or 2. Hereinafter, at least some operations of FIG. 3 will be described with reference to FIG. 4.

Figure 4:
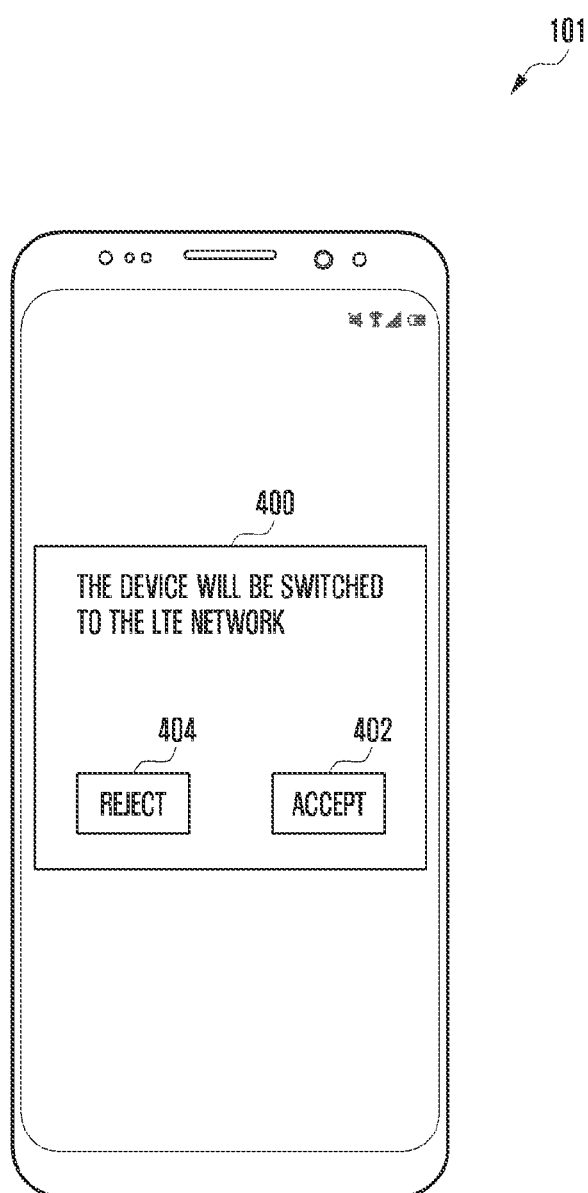
FIG. 4 illustrates a screen configuration for displaying information about a handover to a second communication network in an electronic device according to an embodiment of the disclosure.

FIG. 4 illustrates a screen configuration for displaying information about a handover to a second communication network in an electronic device according to an embodiment of the disclosure.

Referring to FIG. 3, in operation 301, the electronic device (e.g., the processor 120 and/or the wireless communication module 192 of FIG. 1) may connect to a first communication network (e.g., a 5G network) and may transmit and receive data through the first communication network. When the electric field intensity (e.g., a received signal strength indication (RSSI)) of the first communication network is equal to or higher than a reference electric field strength, the processor 120 (e.g., the application processor 210 of FIG. 2) may be connected to the first communication network through the wireless communication module 192 to transmit and receive data.

In operation 303, the electronic device (e.g., the processor 120) may determine whether to perform a handover to a second communication network, based on whether the display device 160 is activated and a data throughput. When the display device 160 is switched to the inactive state and the data throughput is lower than a reference throughput, the processor 120 may determine to perform a handover to the second communication network. When the display device 160 is in the active state or the data throughput is higher than the reference throughput, the processor 120 may determine to maintain the connection to the first communication network.

In operation 305, the electronic device (e.g., the processor 120) may identify whether it is determined to perform a handover to the second communication network, based on whether the display device 160 is activated and the data throughput. When it is determined to maintain the connection to the first communication network (e.g., No in operation 305), the electronic device (e.g., the processor 120 and/or the wireless communication module 192) may maintain the connection to the first communication network.

When it is determined to perform a handover to the second communication network (e.g., a 4G network) (e.g., Yes in operation 305), the electronic device (e.g., the processor 120 and/or the wireless communication module 192) may perform the handover to the second communication network in operation 307. When it is determined to perform a handover to the second communication network, based on whether the display device 160 is activated and the data throughput, the processor 120 may identify the channel state (e.g., electric field intensity) of at least one second communication network adjacent to the electronic device 101. The processor 120 may perform a handover to a second communication network that is equal to or higher than a reference electric field intensity. In one example, when there is a plurality of second communication networks having an electric field intensity equal to or higher than the reference electric field, the processor 120 may perform a handover to a second communication network having the highest electric field intensity.

When it is determined to perform the handover to the second communication network (e.g., the 4G network), the processor 120 may indicate the handover to the second communication network to the wireless communication module 192. When the handover to the second communication network is indicated, the wireless communication module 192 may identify whether there is data transmitted and received through the first communication network. When there is no data transmitted and received through the first communication network, the wireless communication module 192 may perform a handover to the second communication network. When there is data transmitted and received through the first communication network, the wireless communication module 192 may perform a handover to the second communication network after completing transmission and reception of the data using the first communication network. For example, when there is no data transmitted and received through the first communication network for a certain time period (e.g., 10 seconds), the wireless communication module 192 (e.g., the first CP 220 or the second CP 230) may perform a handover to the second communication network.

When it is determined to perform a handover to the second communication network (e.g., Yes in operation 305), the processor 120 may display information 400 about the handover to the second communication network on the display device 160. When an input to select an Accept menu 402 is detected, the processor 120 may perform a handover to the second communication network. When an input to select a Reject menu 404 is detected, the processor 120 may determine that the user of the electronic device 101 does not want a handover to the second communication network. Accordingly, the processor 120 may maintain the connection to the first communication network. When inputs to select the Accept menu 402 and the Reject menu 404 are not detected for a reference time period, the processor 120 may perform a handover to the second communication network.

Figure 5:
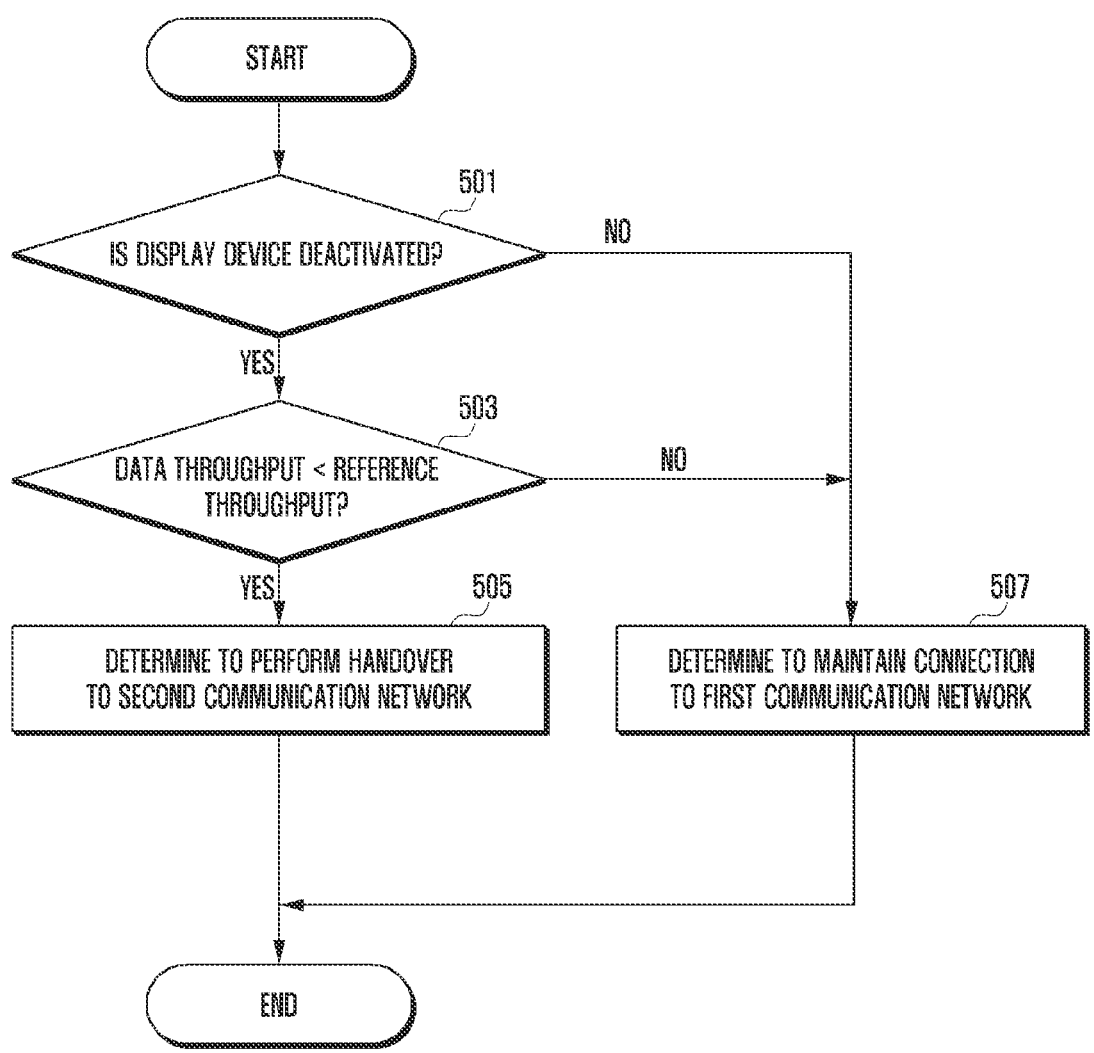
FIG. 5 is a flowchart showing that an electronic device determines whether to perform a handover, based on the state of a display device and a data throughput according to an embodiment of the disclosure.

FIG. 5 is a flowchart showing that an electronic device determines whether to perform a handover, based on the state of a display device and a data throughput according to an embodiment of the disclosure.

The following operations of FIG. 5 may be detailed operations of operation 303 of FIG. 3. In the following embodiments, individual operations may be performed sequentially but are not necessarily performed sequentially. For example, the order of individual operations may be changed, and at least two operations may be performed in parallel. Here, the electronic device may be the electronic device 101 of FIG. 1 or 2.

Referring to FIG. 5, in operation 501, the electronic device (e.g., the processor 120 of FIG. 1) may determine whether the display device 160 is switched to the inactive state. When the electronic device 101 is connected to a first communication network (e.g., an NR network) (e.g., operation 301 of FIG. 3), the processor 120 (e.g., the application processor 210 of FIG. 2) may identify whether the display device 160 remains in the inactive state for a reference time period. When the display device 160 remains in the inactive state for the reference time period, the processor 120 may determine that the display device 160 is switched to the inactive state.

When the display device 160 is switched to the inactive state (e.g., Yes in operation 501), the electronic device (e.g., the processor 120) may identify whether the data throughput of the electronic device is lower than a reference throughput in operation 503. When the display device 160 is switched to the inactive state, the processor 120 may periodically determine the data throughput of the electronic device 101, based on the amount of data transmitted and received through a wireless communication module 192.

When the data throughput of the electronic device is lower than the reference throughput (e.g., Yes in operation 503), the electronic device (e.g., the processor 120 and/or the wireless communication module 192) may determine to hand over a communication network to a second communication network (e.g., an LTE network) in operation 505. When the display device 160 is switched to the inactive state and the data throughput is lower than the reference throughput, the processor 120 may identify the electric field intensities of second communication networks adjacent to the electronic device 101. Among the second communication networks adjacent to the electronic device 101, a second communication network having an electric field intensity equal to or higher than a reference electric field strength may be selected as a network to which the electronic device 101 performs a handover.

When the display device 160 remains in the active state (e.g., No in operation 501) or the data throughput of the electronic device is equal to or higher than the reference throughput (e.g., No in operation 503), the electronic device (e.g., the processor 120 and/or the wireless communication module 192) may determine to maintain the connection to the first communication network in operation 507. The wireless communication module 192 may transmit and receive data through the first communication network.

When the connection to the first communication network is maintained with the display device 160 being in the inactive state, the processor 120 may periodically identify the data throughput of the electronic device 101. When the data throughput of the electronic device 101 is lower than the reference throughput with the display device 160 being in the inactive state, the processor 120 may control the wireless communication module 192 to perform a handover to the second communication network.

Figure 6:
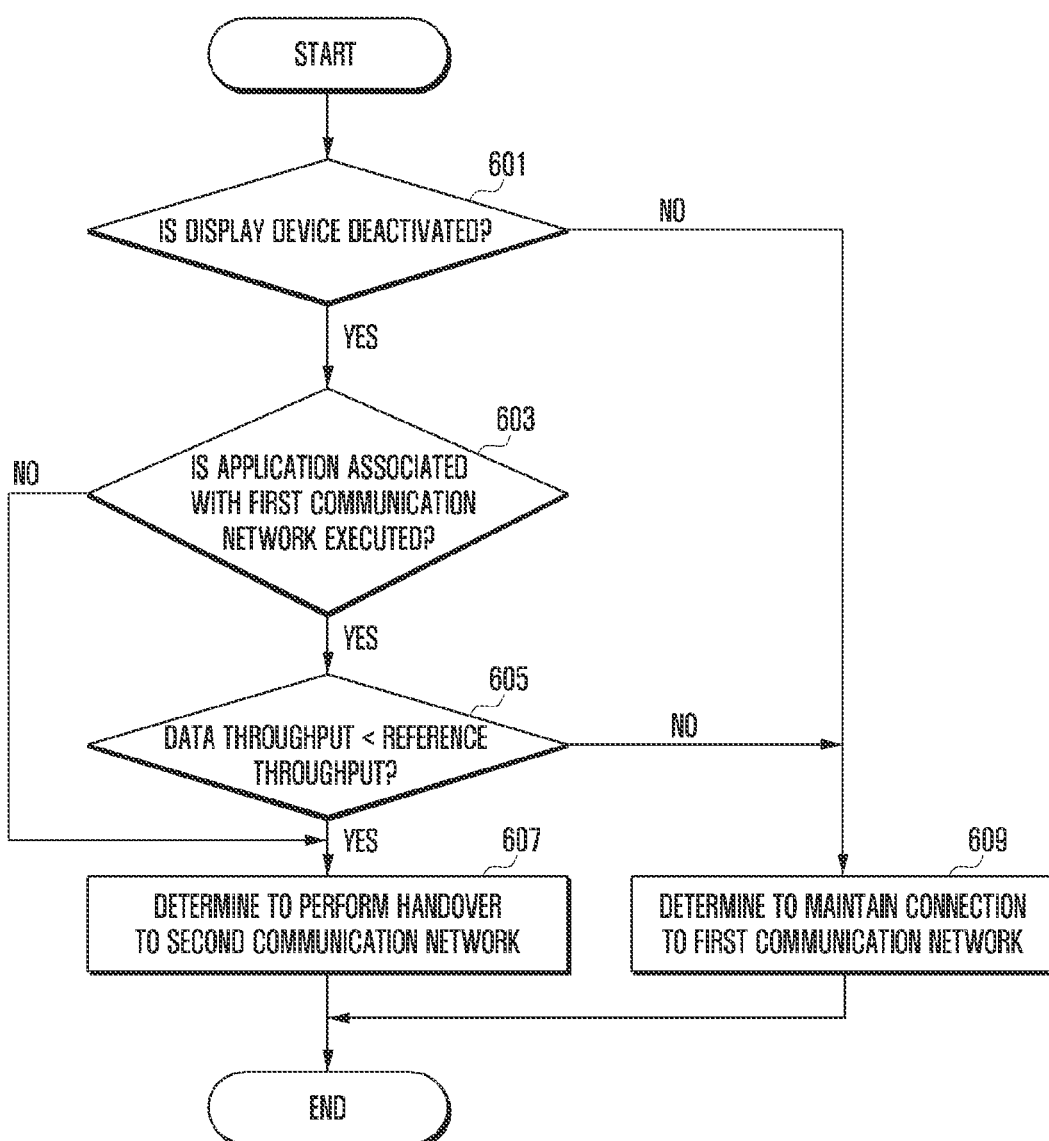
FIG. 6 is a flowchart showing that an electronic device determines whether to perform a handover, based on the state of a display device, a characteristic of an application program, and a data throughput according to an embodiment of the disclosure.

FIG. 6 is a flowchart showing that an electronic device determines whether to perform a handover, based on the state of a display device, a characteristic of an application program, and a data throughput according to an embodiment of the disclosure.

The following operations of FIG. 6 may be detailed operations of operation 303 of FIG. 3. In the following embodiments, individual operations may be performed sequentially but are not necessarily performed sequentially. For example, the order of individual operations may be changed, and at least two operations may be performed in parallel. Here, the electronic device may be the electronic device 101 of FIG. 1 or 2.

Referring to FIG. 6, in operation 601, the electronic device (e.g., the processor 120 of FIG. 1) may identify whether the display device 160 is switched to the inactive state with the electronic device 101 connected to a first communication network (e.g., a 5G network) (e.g., operation 301 of FIG. 3). For example, a switch of the display device 160 to the inactive state may include a state in which the display device 160 remains in the inactive state for a reference time period.

When the display device 160 is switched to the inactive state (e.g., Yes in operation 601), the electronic device (e.g., the processor 120) may identify whether an application program associated with the first communication network is being executed in operation 603. For example, the application program associated with the first communication network may include at least one application program that provides a service using the first communication network.

When the application program associated with the first communication network is being executed (e.g., Yes in operation 603), the electronic device (e.g., the processor 120) may identify whether the data throughput of the electronic device is lower than a reference throughput in operation 605. For example, the data throughput of the electronic device 101 may be determined based on the amount of data transmitted and received through a wireless communication module 192 for a reference time period in a case that the display device 160 is switched to the inactive state.

When the application program associated with the first communication network is not being executed (e.g., No in operation 603) or the data throughput of the electronic device is lower than the reference throughput (e.g., Yes in operation 605), the electronic device (e.g., the processor 120 and/or the wireless communication module 192) may determine to hand over a communication network to a second communication network (e.g., an LTE network) in operation 607. For example, the second communication network to which the electronic device 101 is handed over may include an LTE network having an electric field intensity equal to or higher than a reference electric field strength.

When the display device 160 remains in the active state (e.g., No in operation 601) or the data throughput of the electronic device is equal to or higher than the reference throughput (e.g., No in operation 605), the electronic device (e.g., the processor 120 and/or the wireless communication module 192) may determine to maintain the connection to the first communication network in operation 609.

When the connection to the first communication network is maintained based on execution of the application program associated with the first communication network with the display device 160 being in the inactive state, the processor 120 may periodically identify the data throughput of the electronic device 101. When the data throughput of the electronic device 101 is lower than the reference throughput with the display device 160 being in the inactive state, the processor 120 may control the wireless communication module 192 to perform a handover to the second communication network.

Figure 7:
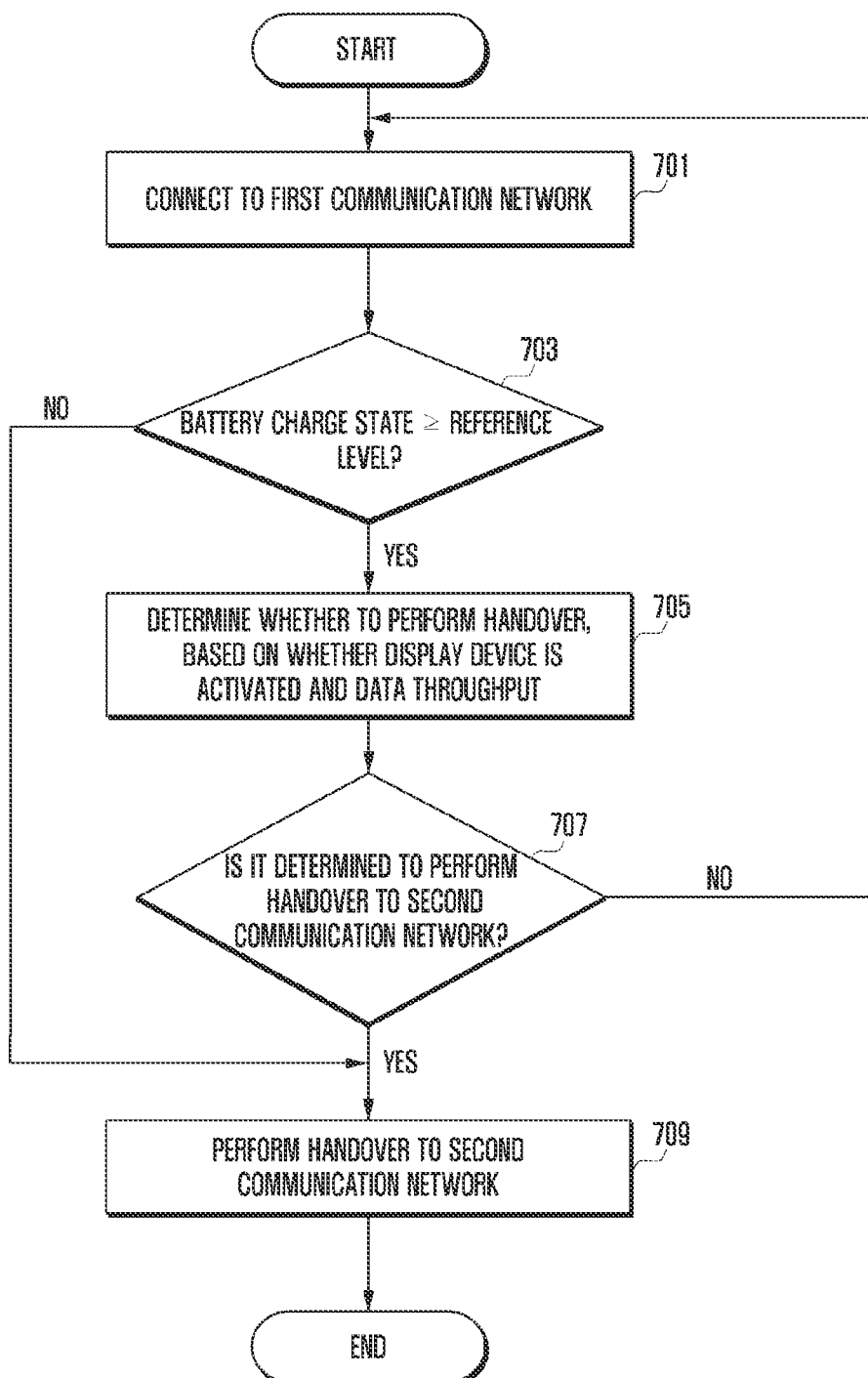
FIG. 7 is a flowchart showing that an electronic device performs a handover to a second communication network, based on a battery charge state according to an embodiment of the disclosure.

FIG. 7 is a flowchart showing that an electronic device performs a handover to a second communication network, based on a battery charge state according to an embodiment of the disclosure.

In the following embodiments, individual operations may be performed sequentially but are not necessarily performed sequentially. For example, the order of individual operations may be changed, and at least two operations may be performed in parallel. Here, the electronic device may be the electronic device 101 of FIG. 1 or 2. Hereinafter, at least some operations of FIG. 7 will be described with reference to FIG. 8.

Figure 8:
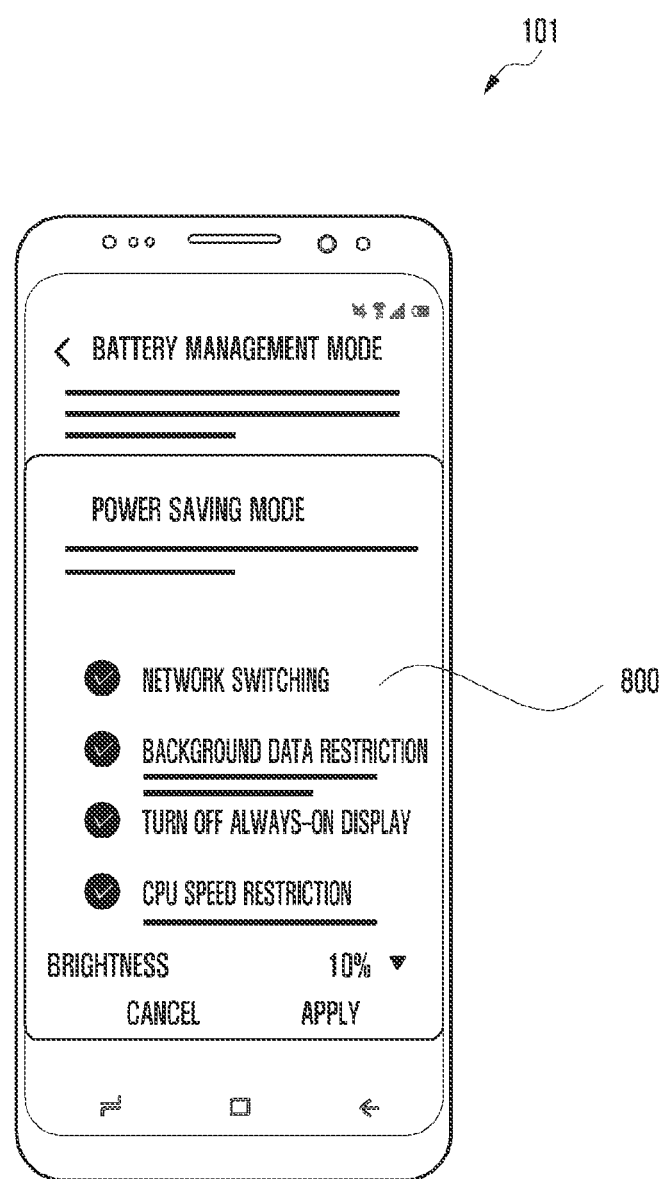
FIG. 8 illustrates the screen configuration of a handover setting menu considering a battery charge state in an electronic device according to an embodiment of the disclosure.

FIG. 8 illustrates the screen configuration of a handover setting menu considering a battery charge state in an electronic device according to an embodiment of the disclosure.

Referring to FIGS. 7 and 8, in operation 701, the electronic device (e.g., the processor 120 and/or the wireless communication module 192 of FIG. 1) may transmit and receive data through a first communication network (e.g., an NR network). The wireless communication module 192 may connect to the first communication network having an electric field intensity equal to or higher than a reference electric field strength to transmit and receive the data.

In operation 703, the electronic device (e.g., the processor 120 and/or the power management module 188) may identify whether the charge state level (SoC level) of a battery is equal to or greater than a reference level. For example, the charge state level of the battery may be reported by the power management module 188 to the processor 120 periodically or when the charge state level of the battery is changed.

When the charge state level (SoC level) of the battery is equal to or greater than the reference level (e.g., Yes in operation 703), the electronic device (e.g., the processor 120) may determine whether to perform a handover to a second communication network, based on whether the display device 160 is activated and a data throughput, in operation 705. As shown in operations 501 to 507 of FIG. 5, the processor 120 (e.g., the application processor 210 of FIG. 2) may determine whether to perform a handover to the second communication network, based on whether the display device 160 is activated and the data throughput. As shown in operations 601 to 609 of FIG. 6, the processor 120 (e.g., the application processor 210 of FIG. 2) may determine whether to perform a handover to the second communication network, based on whether the display device 160 is activated, whether an application program associated with the first communication network is executed, and the data throughput.

In operation 707, the electronic device (e.g., the processor 120) may identify whether it is determined to perform a handover to the second communication network, based on whether the display device 160 is activated and the data throughput. When the display device 160 is switched to the inactive state and the data throughput is lower than a reference throughput, the processor 120 may determine to perform a handover to the second communication network. When the display device 160 is switched to the inactive state and the application program associated with the first communication network is executed but the data throughput is lower than the reference throughput, the processor 120 determines to perform a handover to the second communication network.

When it is determined not to perform a handover to the second communication network in operation 705 (e.g., No in operation 707), the electronic device (e.g., the processor 120 and/or the wireless communication module 192) may maintain the connection to the first communication network.

When the charge state level (SoC level) of the battery is lower than the reference level (e.g., No in operation 703) or it is determined to perform a handover to the second communication network (e.g., Yes in operation 707), the electronic device (e.g., the processor 120 and/or the wireless communication module 192) may perform a handover to the second communication network in operation 709. The processor 120 may provide a request for a handover to the second communication network to the wireless communication module 192. The wireless communication module 192 may perform a handover to the second communication network having an electric field intensity equal to or higher than the reference electric field strength. When determining the handover to the second communication network, based on the charge state of the battery, the processor 120 may transmit a handover request message to the first communication network. When determining the handover to the second communication network, based on the charge state of the battery, the processor 120 may control the wireless communication module 192 to perform a handover to the second communication network regardless of whether there is data transmitted and received through the first communication network. In one example, the processor 120 may provide information related to a parameter (e.g., first state information or charge state information about the battery) considered in determining the handover to the second communication network to the wireless communication module 192. For example, the processor 120 may add parameter information to the handover request message, may configure the handover request message in a different form to correspond to the parameter, or may transmit the parameter information using a separate message.

According to various embodiments of the disclosure, the electronic device 101 may switch a network, based on whether an external power source is connected. When the electronic device 101 is connected to an external power source and is supplied with power from the external power source, the processor 120 (e.g., the application processor 210 of FIG. 2) may determine whether to perform a handover to the second communication network, based on whether the display device 160 is activated and the data throughput as shown in operations 501 to 507 of FIG. 5. When the electronic device 101 is connected to an external power source and is supplied with power from the external power source, the processor 120 (e.g., the application processor 210 of FIG. 2) may determine whether to perform a handover to the second communication network, based on whether the display device 160 is activated, whether an application program associated with the first communication network is executed, and the data throughput as shown in operations 601 to 609 of FIG. 6. When the electronic device 101 is not connected to an external power source, the processor 120 (e.g., the application processor 210 of FIG. 2) may determine whether to perform a handover to the second communication network, based on the charge state level of the battery as shown in operations 701 to 709 of FIG. 7.

When a network switching menu 800 is configured in a power saving mode of a battery management mode, the electronic device 101 (e.g., the processor 120) may switch a network, based on the charge state level of the battery 189 or whether an external power source is connected as shown in operations 701 to 709 of FIG. 7.

Figure 9:
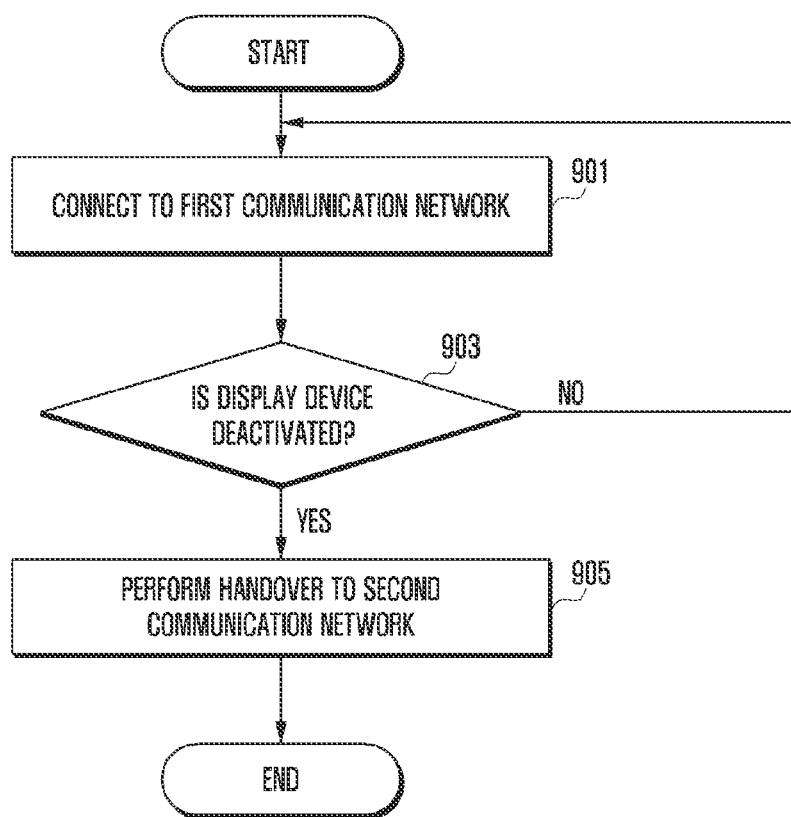
FIG. 9 is a flowchart showing that an electronic device performs a handover to a second communication network, based on the state of a display device according to an embodiment of the disclosure.

FIG. 9 is a flowchart showing that an electronic device performs a handover to a second communication network, based on the state of a display device according to an embodiment of the disclosure.

In the following embodiments, individual operations may be performed sequentially but are not necessarily performed sequentially. For example, the order of individual operations may be changed, and at least two operations may be performed in parallel. Here, the electronic device may be the electronic device 101 of FIG. 1 or 2.

Referring to FIG. 9, in operation 901, the electronic device (e.g., the processor 120 and/or the wireless communication module 192 of FIG. 1) may connect to a first communication network (e.g., a 5G network) having an electric field intensity equal to or higher than a reference electric field strength and may transmit and receive data through the first communication network.

In operation 903, the electronic device (e.g., the processor 120) may identify whether the display device 160 is deactivated, while connected to the first communication network. When the display device 160 remains in the inactive state for a reference time period, the processor 120 (e.g., the application processor 210 of FIG. 2) may determine that the display device 160 is deactivated. In one example, the processor 120 may identify whether the display device 160 remains in the inactive state for the reference time period from the time when a deactivation request signal is transmitted to the display device 160. In another example, the processor 120 may identify whether the display device 160 remains in the inactive state for the reference time period from the time when a deactivation switch signal is received from the display device 160.

When the display device 160 is deactivated (e.g., Yes in operation 903), the electronic device (e.g., the processor 120 and/or the wireless communication module 192) may perform a handover to a second communication network in operation 905. For example, the second communication network to which the electronic device 101 is handed over may include a network having an electric field intensity equal to or higher than the reference electric field strength. When the handover to the second communication network is determined based on whether the display device 160 is activated, the processor 120 may control the wireless communication module 192 to perform the handover to the second communication network at a time when there is no data transmitted and received through the first communication network.

According to various embodiments, when the display device 160 is in the active state (e.g., No in operation 903), the electronic device (e.g., the processor 120 and/or the wireless communication module 192) may maintain the connection to the first communication network. For example, the active state of the display device 160 may include a state in which the display device 160 is deactivated but reactivated within the reference time period.

When determining that a user is in an environment where the electronic device 101 cannot be used, such as a movie theater, based on sensing data obtained by the sensor module 176, the electronic device (e.g., the processor 120) may perform a handover to the second communication network.

Figure 10:
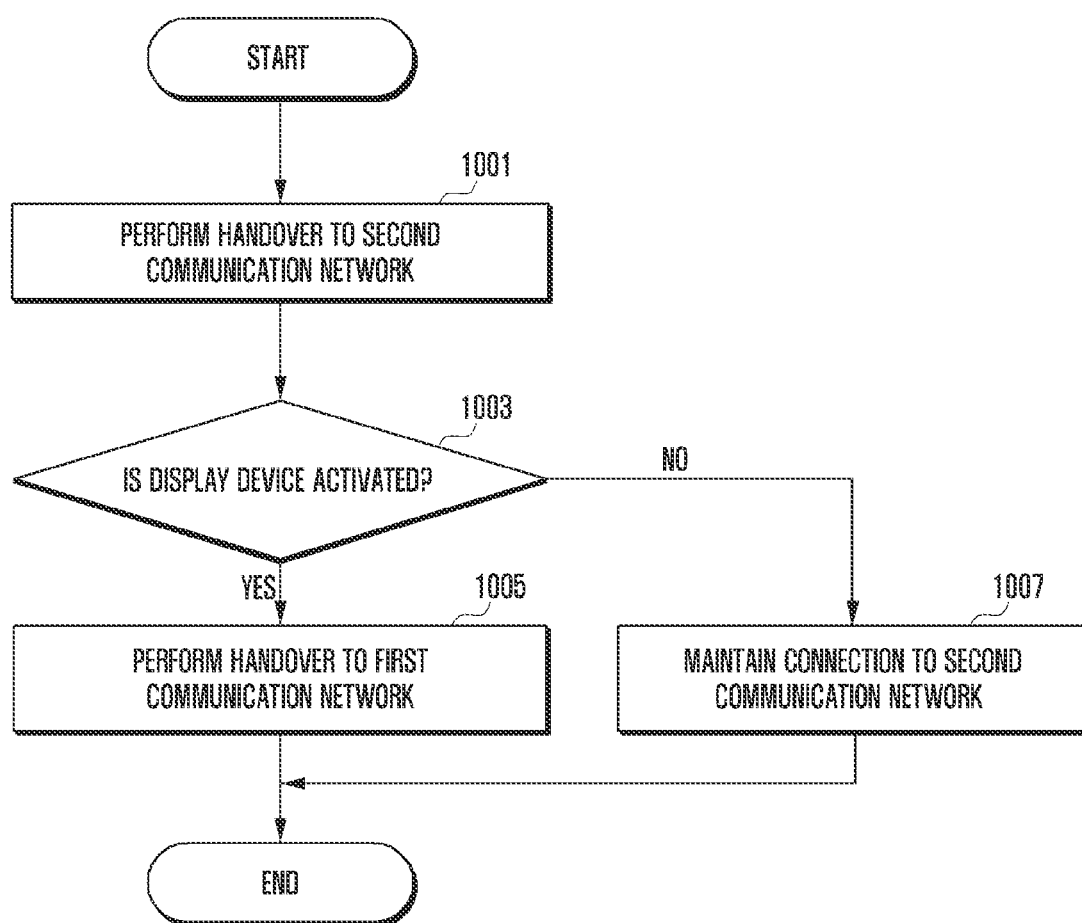
FIG. 10 is a flowchart showing that an electronic device performs a handover to a first communication network, based on the state of a display device according to an embodiment of the disclosure.

FIG. 10 is a flowchart 1000 showing that an electronic device performs a handover to a first communication network, based on the state of a display device according to an embodiment of the disclosure.

In the following embodiments, individual operations may be performed sequentially but are not necessarily performed sequentially. For example, the order of individual operations may be changed, and at least two operations may be performed in parallel. Here, the electronic device may be the electronic device 101 of FIG. 1 or 2.

Referring to FIG. 10, in operation 1001, the electronic device (e.g., the processor 120 and/or the wireless communication module 192 of FIG. 1) may perform a handover to a second communication network. When data transmission and reception is performed through the first communication network, the processor 120 (e.g., the application processor 210 of FIG. 2) may control the wireless communication module 192 to perform a handover to the second communication network, based on at least one of whether the display device 160 is activated, the data throughput of the electronic device 101, whether an application program associated with the first communication network is executed, the charge state (SoC) level of the battery 189, or whether an external power source is connected.

In operation 1003, the electronic device (e.g., the processor 120) may identify whether the display device 160 is activated, while connected to the second communication network through the handover. In one example, whether the display device 160 is activated may be determined based on whether the processor 120 transmits an activation request signal to the display device 160. In one example, whether the display device 160 is active may be determined based on whether the processor 120 receives an activation switch signal from the display device 160.

When the display device 160 is activated (e.g., Yes in operation 1003), the electronic device (e.g., the processor 120 and/or the wireless communication module 192) may perform a handover to the first communication network in operation 1005. For example, the first communication network to which the electronic device 101 is handed over may include a network having an electric field intensity equal to or higher than a reference electric field strength.

When the display device 160 is in the inactive state (e.g., No in operation 1003), the electronic device (e.g., the processor 120 and/or the wireless communication module 192) may maintain the connection to the second communication network in operation 1007.

Figure 11:
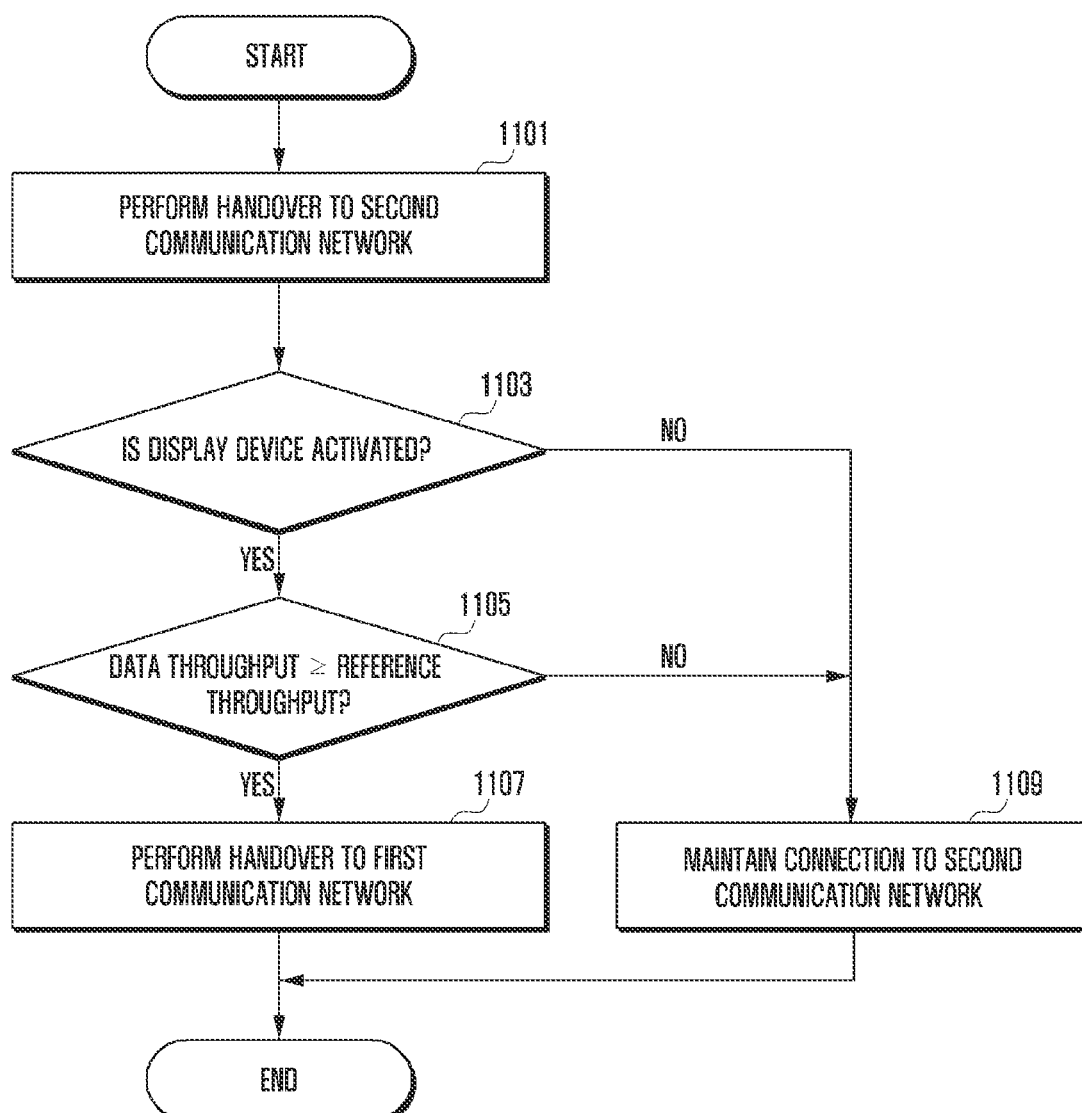
FIG. 11 is a flowchart showing that an electronic device performs a handover to a first communication network, based on the state of a display device and a data throughput according to an embodiment of the disclosure.

FIG. 11 is a flowchart 1100 showing that an electronic device performs a handover to a first communication network, based on the state of a display device and a data throughput according to an embodiment of the disclosure.

In the following embodiments, individual operations may be performed sequentially but are not necessarily performed sequentially. For example, the order of individual operations may be changed, and at least two operations may be performed in parallel. Here, the electronic device may be the electronic device 101 of FIG. 1 or 2.

Referring to FIG. 11, in operation 1101, the electronic device (e.g., the processor 120 and/or the wireless communication module 192 of FIG. 1) may perform a handover to a second communication network. The wireless communication module 192 may perform a handover to the second communication network, based on control of the processor 120, while connected to the first communication network.

In operation 1103, the electronic device (e.g., the processor 120) may identify whether the display device 160 is activated, while connected to the second communication network through the handover. For example, the inactive state of the display device 160 may include an always-on-display (AOD) mode of the display device 160.

When the display device 160 is activated (e.g., Yes in operation 1103), the electronic device (e.g., the processor 120) may identify whether the data throughput of the electronic device 101 is equal to or higher than a reference throughput in operation 1105. When the display device 160 is in the inactive state, the processor 120 may periodically identify the data throughput of the electronic device 101, based on the amount of data transmitted and received through the wireless communication module 192.

When the data throughput of the electronic device 101 is equal to or higher than the reference throughput (e.g.: Yes in operation 1105), the electronic device (e.g., the processor 120 and/or the wireless communication module 192) may perform a handover to the first communication network in operation 1107. The wireless communication module 192 may perform a handover to the first communication network having an electric field intensity equal to or higher than a reference electric field strength.

When the display device 160 is in the inactive state (e.g., No in operation 1103) or the data throughput of the electronic device 101 is lower than the reference throughput (e.g.: No in operation 1105), the electronic device (e.g., the processor 120 and/or the wireless communication module 192) may maintain the connection to the second communication network in operation 1109.

Figure 12:
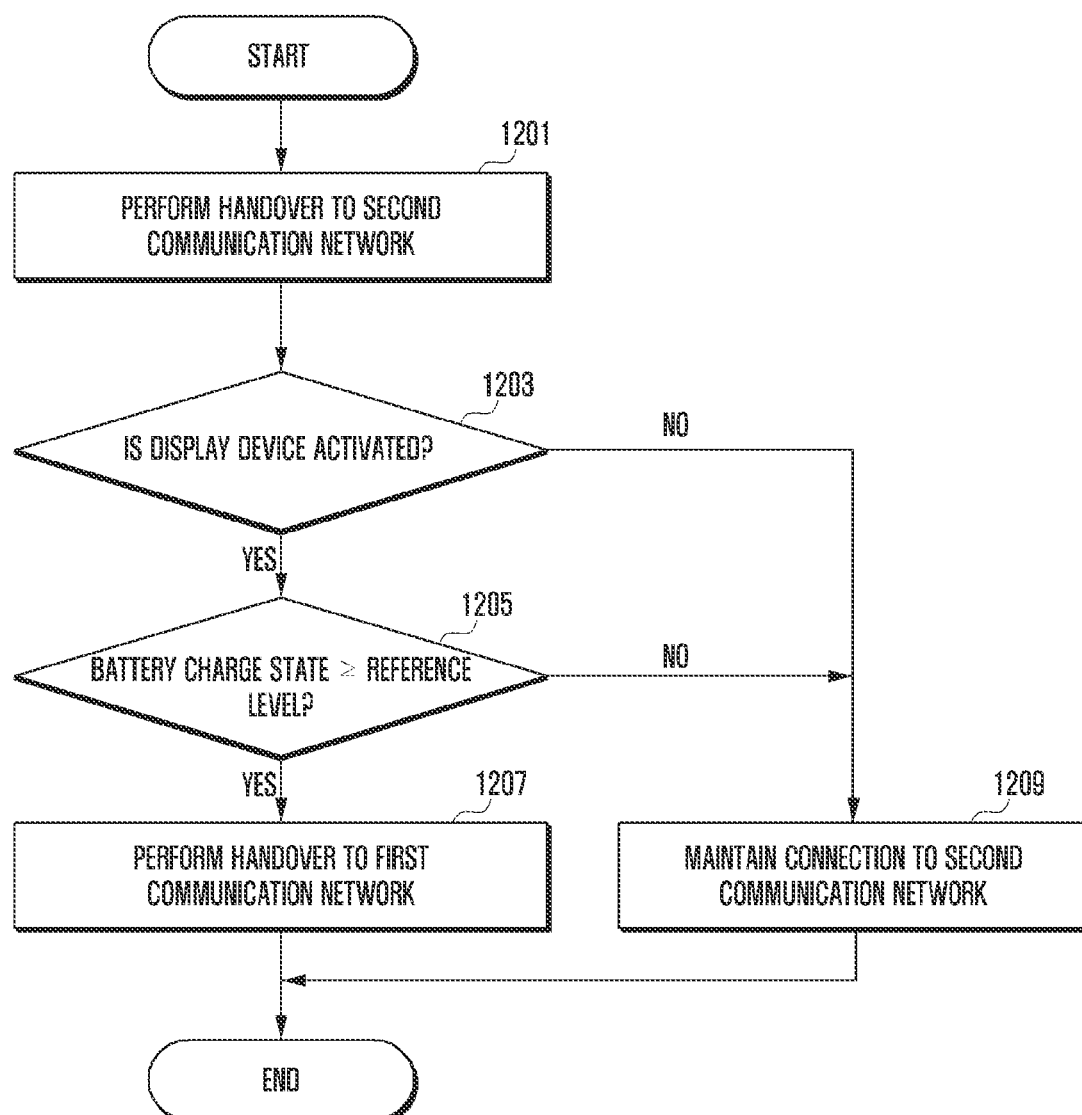
FIG. 12 is a flowchart showing that an electronic device performs a handover to a first communication network, based on the state of a display device and a battery charge state according to an embodiments of the disclosure.

FIG. 12 is a flowchart showing that an electronic device performs a handover to a first communication network, based on the state of a display device and a battery charge state according to an embodiment of the disclosure.

In the following embodiments, individual operations may be performed sequentially but are not necessarily performed sequentially. For example, the order of individual operations may be changed, and at least two operations may be performed in parallel. Here, the electronic device may be the electronic device 101 of FIG. 1 or 2.

Referring to FIG. 12, in operation 1201, the electronic device (e.g., the processor 120 and/or the wireless communication module 192 of FIG. 1) may perform a handover to a second communication network. The wireless communication module 192 may perform a handover to the second communication network, based on whether the display device 160 is activated and a data throughput, as shown in operations 301 to 307 of FIG. 3. The wireless communication module 192 may perform a handover to the second communication network, based on the charge state level of a battery, as shown in operations 701 to 709 of FIG. 7. The wireless communication module 192 may perform a handover to the second communication network, based on whether the display device 160 is activated, as shown in operations 901 to 907 of FIG. 9.

In operation 1203, the electronic device (e.g., the processor 120) may identify whether the display device 160 is activated, while connected to the second communication network through the handover.

When the display device 160 is switched to the active state (e.g., Yes in operation 1203), the electronic device (e.g., the processor 120) may identify whether the battery charge state level of the electronic device 101 is equal to or higher than a reference level in operation 1205. For example, the battery charge state level may include the remaining battery level of the electronic device 101.

When the battery charge state level of the electronic device 101 is equal to or higher than the reference level (e.g., Yes in operation 1205), the electronic device (e.g., the processor 120 and/or the wireless communication module 192) may perform a handover to the first communication network in operation 1207. For example, the electric field intensity of the first communication network to which the electronic device 101 is handed over may be equal to or higher than a reference electric field strength.

When the display device 160 is in the inactive state (e.g., No in operation 1203) or the battery charge state level of the electronic device 101 is lower than the reference level (e.g., No in operation 1205), the electronic device (e.g., the processor 120 and/or the wireless communication module 192) may maintain the connection with the second communication network in operation 1209.

The electronic device 101 may perform a handover to the first communication network, based on whether an external power source is connected. When the electronic device 101 is connected to an external power source and is supplied with power from the external power source at the time when the display device 160 is activated, the processor 120 may perform a handover to the first communication network. When supplied with power from the external power source, the electronic device 101 may determine whether to perform a handover to the first communication network, based on whether the display device 160 is activated regardless of the battery charge state level.

Figure 13:
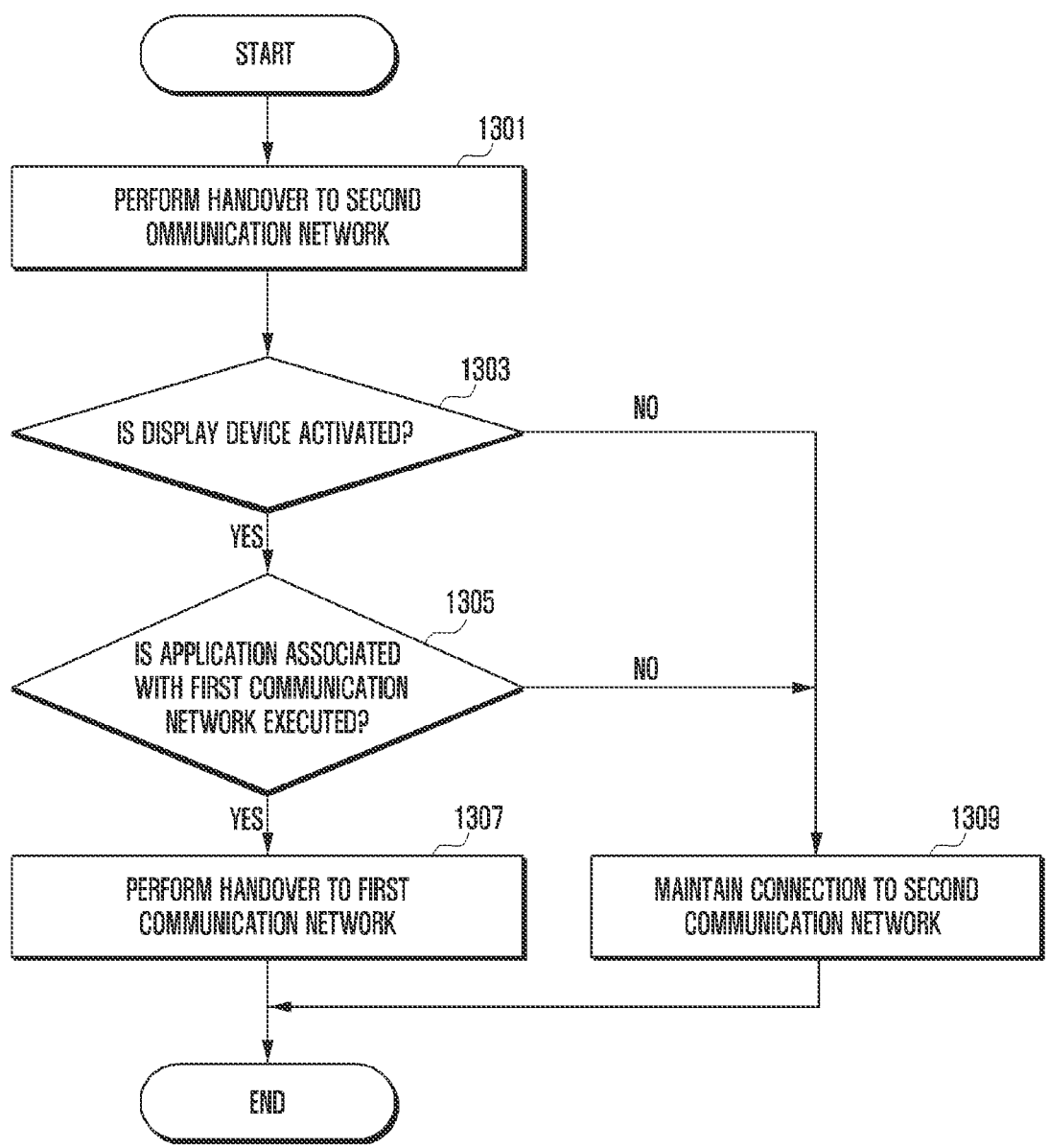
FIG. 13 is a flowchart showing that an electronic device performs a handover to a first communication network, based on the state of a display device and whether an application program is executed according to an embodiment of the disclosure.

FIG. 13 is a flowchart showing that an electronic device performs a handover to a first communication network, based on the state of a display device and whether an application program is executed according to an embodiment of the disclosure.

In the following embodiments, individual operations may be performed sequentially but are not necessarily performed sequentially. For example, the order of individual operations may be changed, and at least two operations may be performed in parallel. Here, the electronic device may be the electronic device 101 of FIG. 1 or 2.

Referring to FIG. 13, in operation 1301, the electronic device (e.g., the processor 120 and/or the wireless communication module 192 of FIG. 1) may perform a handover to a second communication network. The processor 120 may control the wireless communication module 192 to perform a handover to the second communication network, based on state information about the electronic device 101 in order to reduce power consumption due to wireless communication. For example, the state information about the electronic device 101 may include at least one whether the display device 160 is activated, the data throughput of the electronic device 101, whether an application program associated with the first communication network is executed, and the charge state (SoC) level of the battery 189, or whether an external power source is connected.

In operation 1303, the electronic device (e.g., the processor 120) may identify whether the display device 160 is activated, while connected to the second communication network through the handover. The processor 120 may identify whether an event associated with activation of the display device 160 is triggered. For example, the event associated with activation of the display device 160 may include at least one of reception of a call, detection of an input via a power button, or detection of an input via a home button.

When the display device 160 is switched to the active state (e.g., Yes in operation 1303), the electronic device (e.g., the processor 120) may identify whether an application program associated with the first communication network is executed in operation 1305. For example, the application program associated with the first communication network may include at least one application program that provides a service through the first communication network.

When the application program associated with the first communication network is executed (e.g., Yes in operation 1305), the electronic device (e.g., the processor 120 and/or the wireless communication module 192) may perform a handover to the first communication network in operation 1307.

According to various embodiments, when the display device 160 is in the inactive state (e.g., No in operation 1303) or the application program associated with the first communication network is not executed (e.g., No in operation 1305), the electronic device (e.g., the processor 120 and/or the wireless communication module 192) may maintain the connection to the second communication network in operation 1309.

Figure 14:
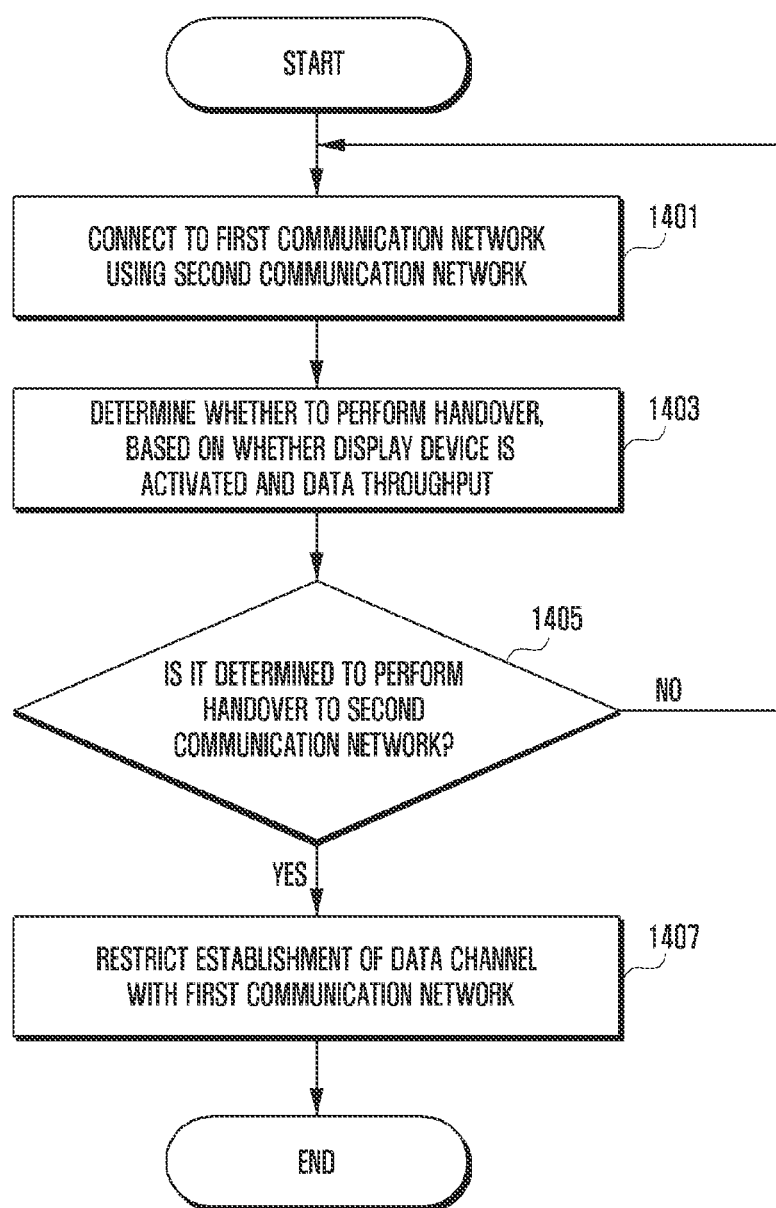
FIG. 14 is a flowchart showing that an electronic device performs a handover from a first communication network configured in a non-standalone (NSA) mode to a second communication network, based on the state of a display device and a data throughput according to an embodiment of the disclosure.

FIG. 14 is a flowchart showing that an electronic device performs a handover from a first communication network configured in the NSA mode to a second communication network, based on the state of a display device and a data throughput according to an embodiment of the disclosure.

In the following embodiments, individual operations may be performed sequentially but are not necessarily performed sequentially. For example, the order of individual operations may be changed, and at least two operations may be performed in parallel. Here, the electronic device may be the electronic device 101 of FIG. 1 or 2.

Referring to FIG. 14, in operation 1401, the electronic device (e.g., the processor 120 and/or the wireless communication module 192 of FIG. 1) may connect to the first communication network (e.g. a 5G network) using the second communication network (e.g., an LTE network). When the first communication network is configured in the non-standalone (NSA) mode, the wireless communication module 192 may establish a control channel through the second communication network. The wireless communication module 192 may establish a data channel with the first communication network, based on control information provided through the control channel with the second communication network. The wireless communication module 192 may transmit and receive data through the data channel with the first communication network.

In operation 1403, the electronic device (e.g., the processor 120) may determine whether to perform a handover to the second communication network, based on whether the display device 160 is activated and a data throughput. The processor 120 (e.g., the application processor 210 of FIG. 2) may determine whether to perform a handover to the second communication network, based on whether the display device 160 is activated and the data throughput, as shown in operations 501 to 507 of FIG. 5. According to an embodiment, the processor 120 may determine whether to perform a handover to the second communication network, based on whether the display device 160 is activated, whether an application program associated with the first communication network is executed, and the data throughput, as shown in operations 601 to 609 of FIG. 6.

In operation 1405, the electronic device (e.g., the processor 120) may identify whether it is determined to perform a handover to the second communication network, based on whether the display device 160 is activated and the data throughput. According to an embodiment, when the display device 160 is switched to the inactive state and the data throughput of the electronic device 101 is lower than a reference throughput, the processor 120 may determine to perform a handover to the second communication network. According to an embodiment, when the display device 160 is switched to the inactive state and the application program associated with the first communication network is not executed, the processor 120 determines to perform a handover to the second communication network.

When it is determined to maintain the connection to the first communication network in operation 1403 (e.g., No in operation 1405), the electronic device (e.g., the processor 120 and/or the wireless communication module 192) may maintain the connection to the first communication network.

When it is determined to perform a handover to the second communication network (e.g., a 4G network) (e.g., Yes in operation 1405), the electronic device (e.g., the processor 120 and/or the wireless communication module 192) may restrict establishment of a data channel with the first communication network in operation 1407. When it is determined to perform a handover to the second communication network, the processor 120 may restrict a data channel request to the first communication network at a time when there is no data transmitted and received through the first communication network.

Figure 15:
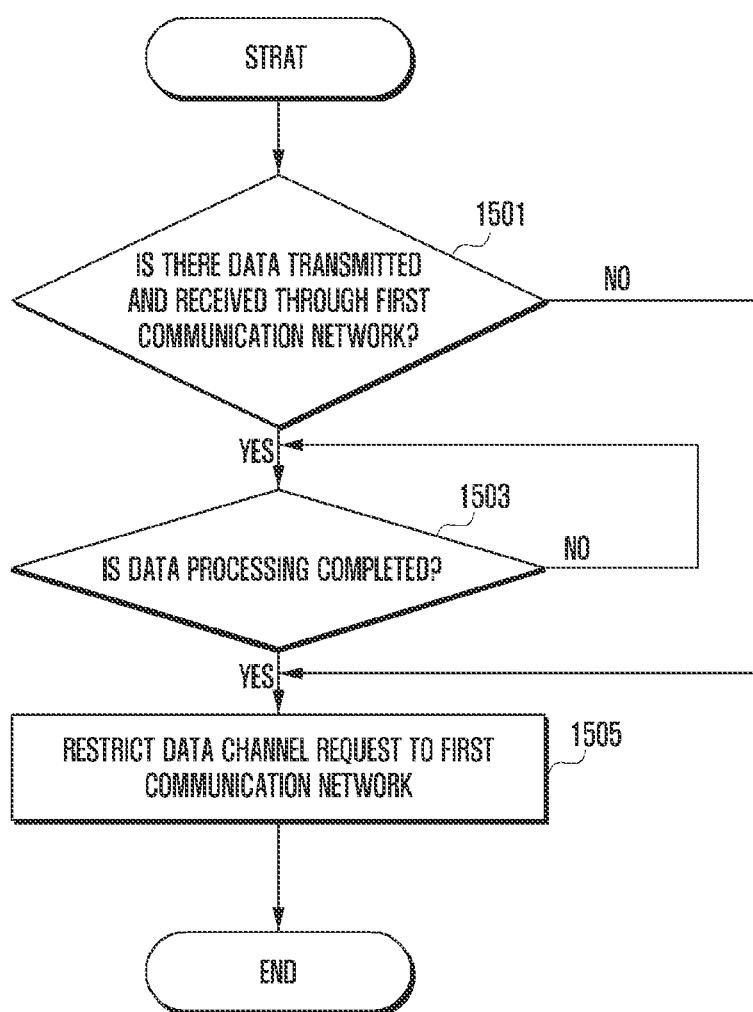
FIG. 15 is a flowchart showing that an electronic device performs a handover to a second communication network according to an embodiment of the disclosure.

FIG. 15 is a flowchart showing that an electronic device performs a handover to a second communication network according to an embodiment of the disclosure.

The following operations of FIG. 15 may be detailed operations of operation 1407 of FIG. 14. In the following embodiments, individual operations may be performed sequentially but are not necessarily performed sequentially. For example, the order of individual operations may be changed, and at least two operations may be performed in parallel. Here, the electronic device may be the electronic device 101 of FIG. 1 or 2.

Referring to FIG. 15, when it is determined to perform a handover to the second communication network (e.g., Yes in operation 1405 of FIG. 14), the electronic device (e.g., the processor 120 and/or the wireless communication module 192 of FIG. 1) may identify whether there is data transmitted and received through a first communication network in operation 1501. The wireless communication module 192 may identify whether there is data transmitted and received through a data channel with the first communication network.

When there is data transmitted and received through the first communication network (e.g., Yes in operation 1501), the electronic device (e.g., the processor 120 and/or the wireless communication module 192) may identify whether transmission and reception of the data through the first communication network is completed in operation 1503.

When transmission and reception of the data through the first communication network is not completed (e.g., No in operation 1503), the electronic device (e.g., the processor 120 and/or the wireless communication module 192) may identify whether transmission and reception of the data through the first communication network is completed. The processor 120 (e.g., the application processor 210 of FIG. 2) may periodically identify whether transmission and reception of the data through the first communication network is completed.

When there is no data transmitted and received through the first communication network (e.g., No in operation 1501) or transmission and reception of the data through the first communication network is completed (e.g., Yes in operation 1503), the electronic device (e.g., the processor 120 and/or the wireless communication module 192) may restrict a data channel request to the first communication network in operation 1505. In this case, a communication channel (control channel and data channel) with the second communication network may be maintained. In one example, restriction of the data channel request may include a state in which the electronic device is configured not to transmit a request message for establishing a data channel to the first communication network when data associated with the electronic device 101 occurs in case that the data channel with the first communication network is disconnected. The electronic device 101 may transmit and receive data associated with the electronic device 101 through the communication channel with the second communication network.

Figure 16:
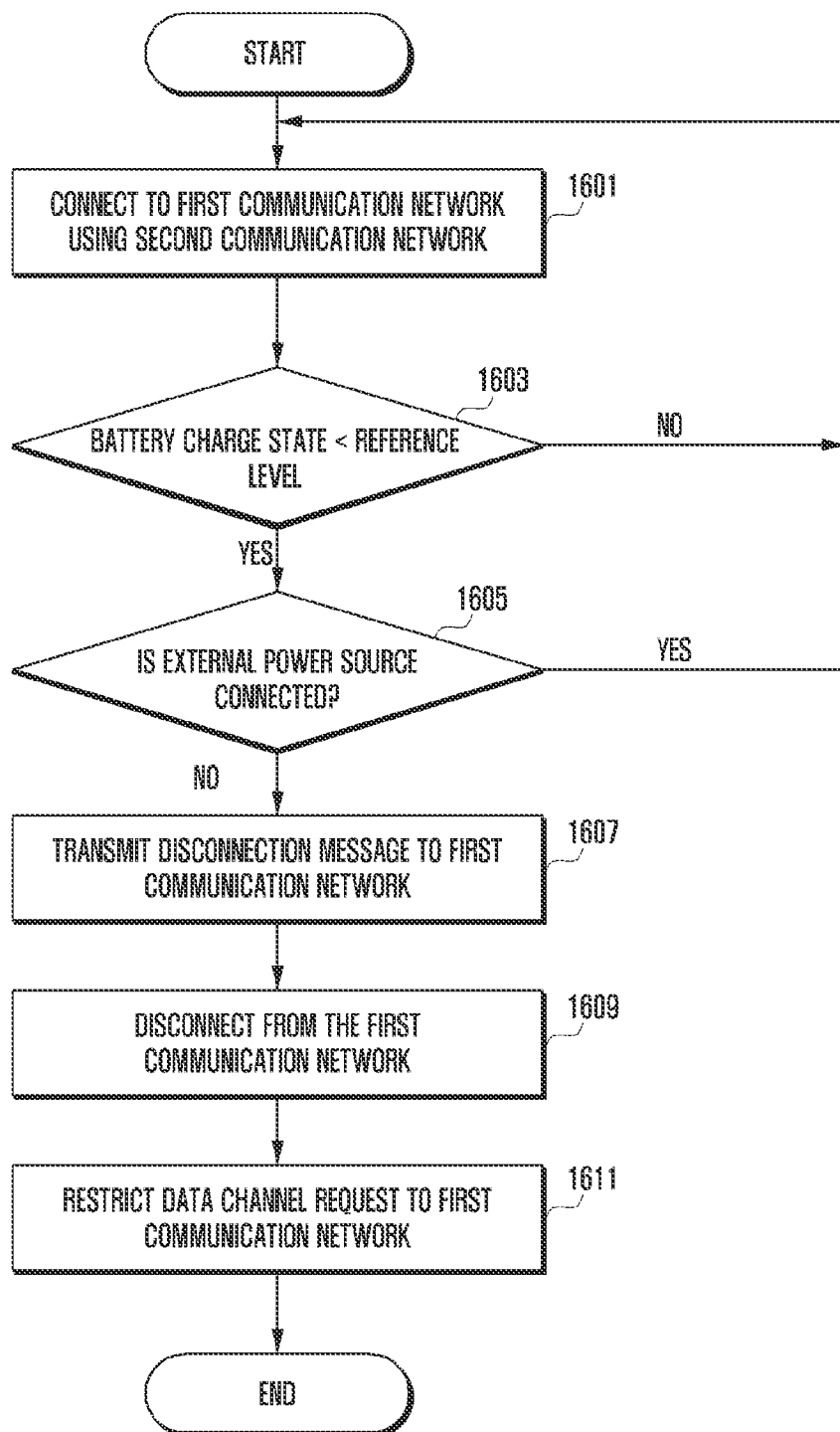
FIG. 16 is a flowchart showing that an electronic device performs a handover from a first communication network configured in an NSA mode to a second communication network, based on charge state information about a battery according to an embodiment of the disclosure.

FIG. 16 is a flowchart showing that an electronic device performs a handover from a first communication network configured in the NSA mode to a second communication network, based on charge state information about a battery according to an embodiment of the disclosure.

In the following embodiments, individual operations may be performed sequentially but are not necessarily performed sequentially. For example, the order of individual operations may be changed, and at least two operations may be performed in parallel. Here, the electronic device may be the electronic device 101 of FIG. 1 or 2.

Referring to FIG. 16, in operation 1601, the electronic device (e.g., the processor 120 and/or the wireless communication module 192 of FIG. 1) may connect to the first communication network (e.g. a 5G network) using the second communication network (e.g., an LTE network). When the first communication network is configured in the non-standalone (NSA) mode, the wireless communication module 192 may establish a data channel with the first communication network, based on control information obtained through the second communication network.

In operation 1603, the electronic device (e.g., the processor 120 and/or the power management module 188) may identify whether the charge state level (SoC) of a battery is less than a reference level. The power management module 188 may provide charge state information about the battery to the processor 120 (e.g., the application processor 210 of FIG. 2) periodically or when the charge state level of the battery is changed.

When the charge state level (SoC) of the battery is less than the reference level (e.g., Yes in operation 1603), the electronic device (e.g., the processor 120 and/or the power management module 188) may identify whether an external power source is connected in operation 1605. The power management module 188 may identify whether power is supplied from an external power source that is connected to the electronic device 101 via a cable or wirelessly.

When no external power source is connected (e.g., No in operation 1605), the electronic device (e.g., the processor 120 and/or the wireless communication module 192) may transmit a disconnection message to the first communication network in operation 1607. When the charge state level of the battery is less than the reference level and no external power source is connected, the processor 120 may determine to perform a handover to the second communication network. The processor 120 may control the wireless communication module 192 to transmit the disconnection message in order to release the data channel with the first communication network.

The electronic device (e.g., the processor 120 and/or the wireless communication module 192) may be disconnected from the first communication network in operation 1609. When receiving a response message (e.g., an ACK signal) to the disconnection message from the first communication network, the processor 120 may release the data channel with the first communication network. The wireless communication module 192 may transmit and receive data through a communication channel with a preset second communication network in order to connect to the first communication network.

In operation 1611, the electronic device (e.g., the processor 120 and/or the wireless communication module 192) may restrict a data channel request to the first communication network. For example, when data associated with the electronic device 101 occurs in a case that the data channel with the first communication network is disconnected, the processor 120 does not transmit a request message for establishing a data channel to the first communication network. In this case, the wireless communication module 192 may transmit and receive the data associated with the electronic device 101 through the communication channel with the second communication network.

When the charge state level (SoC level) of the battery is equal to or greater than the reference level (e.g., No in operation 1603) or an external power source is connected (e.g., Yes in operation 1605), the electronic device (e.g., the processor 120) may determine whether to perform a handover to the second communication network, based on whether the display device 160 is activated and a data throughput. The processor 120 may determine whether to perform a handover to the second communication network, based on whether the display device 160 is activated and the data throughput, as shown in operations 501 to 507 of FIG. 5. The processor 120 may determine whether to perform a handover to the second communication network, based on whether the display device 160 is activated, whether an application program associated with the first communication network is executed, and the data throughput, as shown in operations 601 to 609 of FIG. 6.

Figure 17:
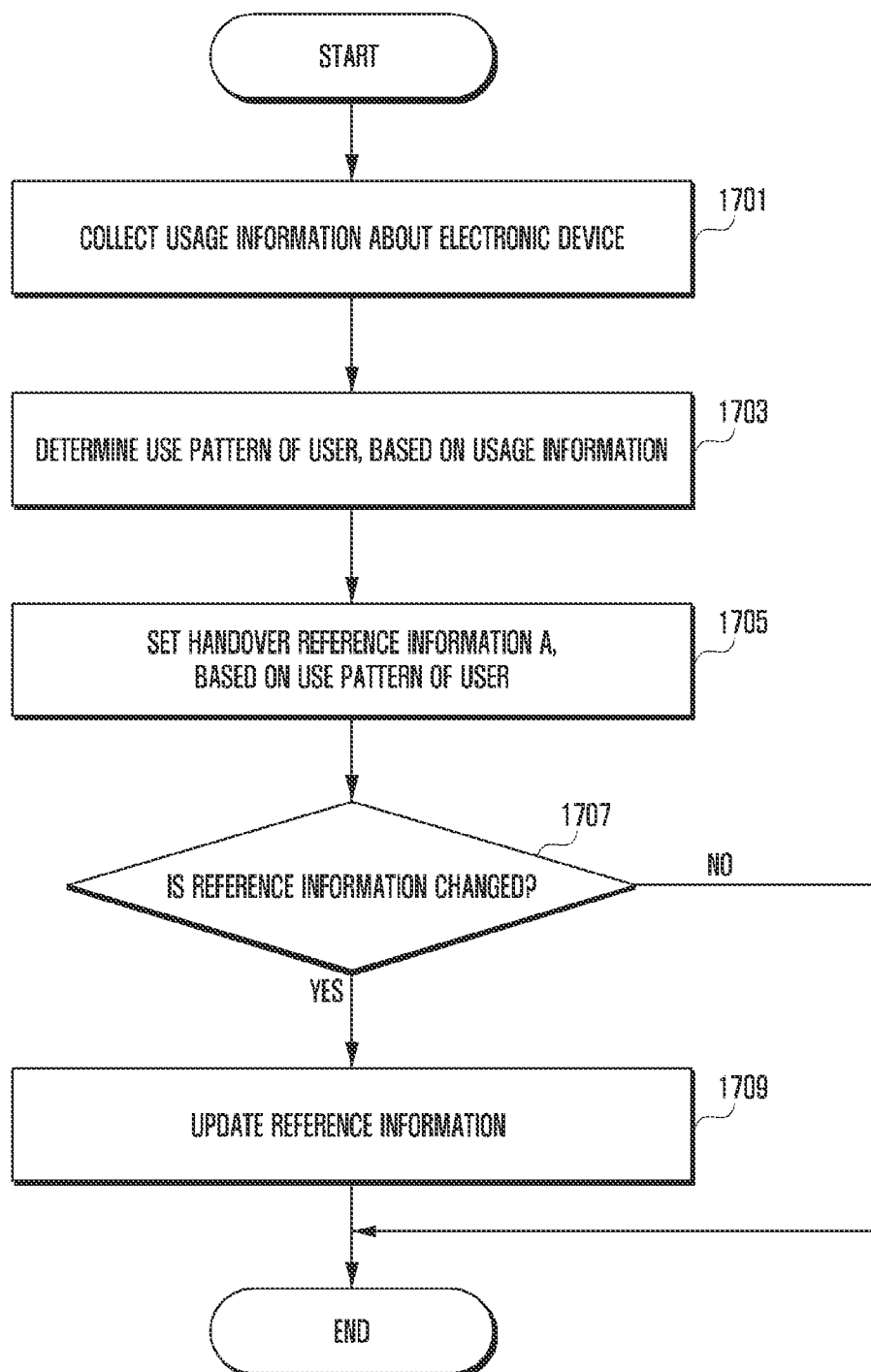
FIG. 17 is a flowchart showing that an electronic device configures handover reference information according to an embodiment of the disclosure.

FIG. 17 is a flowchart showing that an electronic device configures handover reference information according to an embodiment of the disclosure.

In the following embodiments, individual operations may be performed sequentially but are not necessarily performed sequentially. For example, the order of individual operations may be changed, and at least two operations may be performed in parallel. Here, the electronic device may be the electronic device 101 of FIG. 1 or 2.

Referring to FIG. 17, In operation 1701, the electronic device (e.g., the processor 120 of FIG. 1) may collect usage information about the electronic device. For example, the usage information about the electronic device may include at least one of data usage per user of the electronic device 101, a data throughput, the use frequency of an application program, or application program use time.

In operation 1703, the electronic device (e.g., the processor 120) may determine a use pattern of a user with respect to the electronic device, based on the usage information about the electronic device. For example, the use pattern may include at least one of the use frequency, the use time point, or the use time of a service associated with a first communication network. The electronic device may include a numeric processing unit (NPU) to analyze the usage information about the electronic device and to determine the use pattern of the user with respect to the electronic device.

In operation 1705, the electronic device (e.g., the processor 120) may set reference information associated with a handover, based on the use pattern. The frequency of the user using the service associated with the first communication network is relatively high, the processor 120 (e.g., the application processor 210 of FIG. 2) may set the reference information associated with the handover such that the frequency of a handover to a second communication network is reduced. When the frequency of the user using the service associated with the first communication network is relatively low, the processor 120 may set the reference information associated with the handover such that a handover to the second communication network relatively easily occurs. In one example, the processor 120 may set the reference information associated with the handover, based on the position or use time point of the electronic device 101. The reference information associated with the handover may include, for example, at least one of a reference level for comparison with the charge state level of a battery, a reference throughput for comparison with a data throughput, or a reference time period for identifying whether the display device 160 is in the inactive state.

In operation 1707, the electronic device (e.g., the processor 120) may identify whether the reference information associated with the handover has been changed. The processor 120 may identify whether the reference information associated with the handover set in operation 1705 is the same as reference information associated with a handover stored in the memory 130.

When the reference information associated with the handover has been changed (e.g., Yes in operation 1707), the electronic device (e.g., the processor 120) may update the reference information associated with the handover, previously set in the electronic device, to the reference information associated with the handover corresponding to the use pattern of the user in operation 1709. In one example, the reference information associated with the handover may be stored in a table form.

The electronic device may transmit the usage information about the electronic device to a server. The electronic device may update the reference information stored in the electronic device, based on reference information associated with a handover provided from the server.

The electronic device may set reference information associated with a handover, based on a user input. The processor 120 may set reference information associated with a handover, based on a user input to a reference information setting menu.

The electronic device may selectively collect the usage information about the electronic device, based on a user's setting. When the user enables usage information collection, the electronic device may collect the usage information about the electronic device.

When it is determined that the usage information about the electronic device cannot be collected or the collected usage information is unreliable, the electronic device may determine whether to perform a handover to the second communication network using predefined reference information associated with a handover. For example, the predefined reference information associated with the handover may include at least one of previously set reference information or initial reference information set in the electronic device 101.

The electronic device 101 may selectively perform a handover to reduce power consumption due to wireless communication, based on a user input. An operation of selectively performing a handover is described below with reference to FIG. 18 or FIG. 19.

Figure 18:
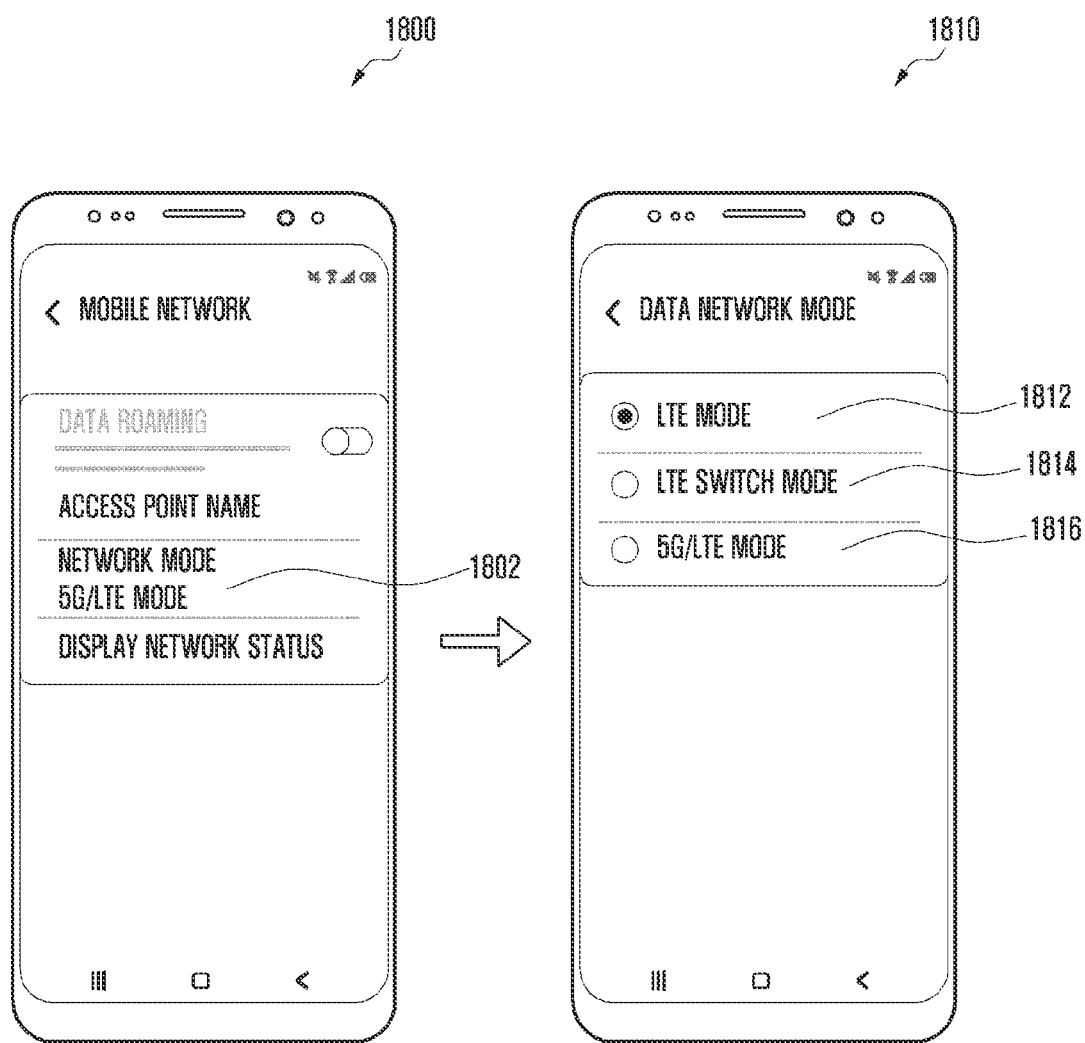
FIG. 18 illustrates the screen configuration of a network mode setting menu in an electronic device according to an embodiment of the disclosure.

FIG. 18 illustrates the screen configuration of a network mode setting menu in an electronic device according to an embodiment of the disclosure.

Referring to FIG. 18, according to an embodiment, the electronic device 101 may provide a network mode menu 1802 for selecting a network for wireless communication in a menu 1800 for managing a network for wireless communication. When detecting an input to select the network mode menu 1802, the electronic device 101 may display a network list 1810 through at least a portion of a display device 160. For example, an LTE mode 1812 may include a mode in which the electronic device 101 preferentially connects to an LTE network among supportable networks. An LTE switch mode 1814 may include a mode of handing over a network for wireless communication to reduce power consumption due to wireless communication. A 5G/LTE mode 1816 may include a mode in which the electronic device 101 preferentially connects to a 5G network (NR network) among supportable networks.

When the LTE switch mode 1814 is selected from the network list 1810, the electronic device 101 may hand over a network for wireless communication, based on at least one of whether the display device 160 is activated, a data throughput, whether an application program associated with a first communication network is executed, the charge state (SoC) of a battery 189, or whether an external power source is connected. For example, when the LTE switch mode 1814 is selected, the electronic device 101 may hand over the network, based on operations 301 to 307 of FIG. 3.

When the LTE switch mode 1814 is not selected from the network list 1810, the electronic device 101 may determine that a handover for reducing power consumption due to wireless communication is restricted. For example, when the LTE switch mode 1814 is not selected, the electronic device 101 may restrict an operation of handing over a network according to operations 301 to 307 of FIG. 3.

Figure 19:
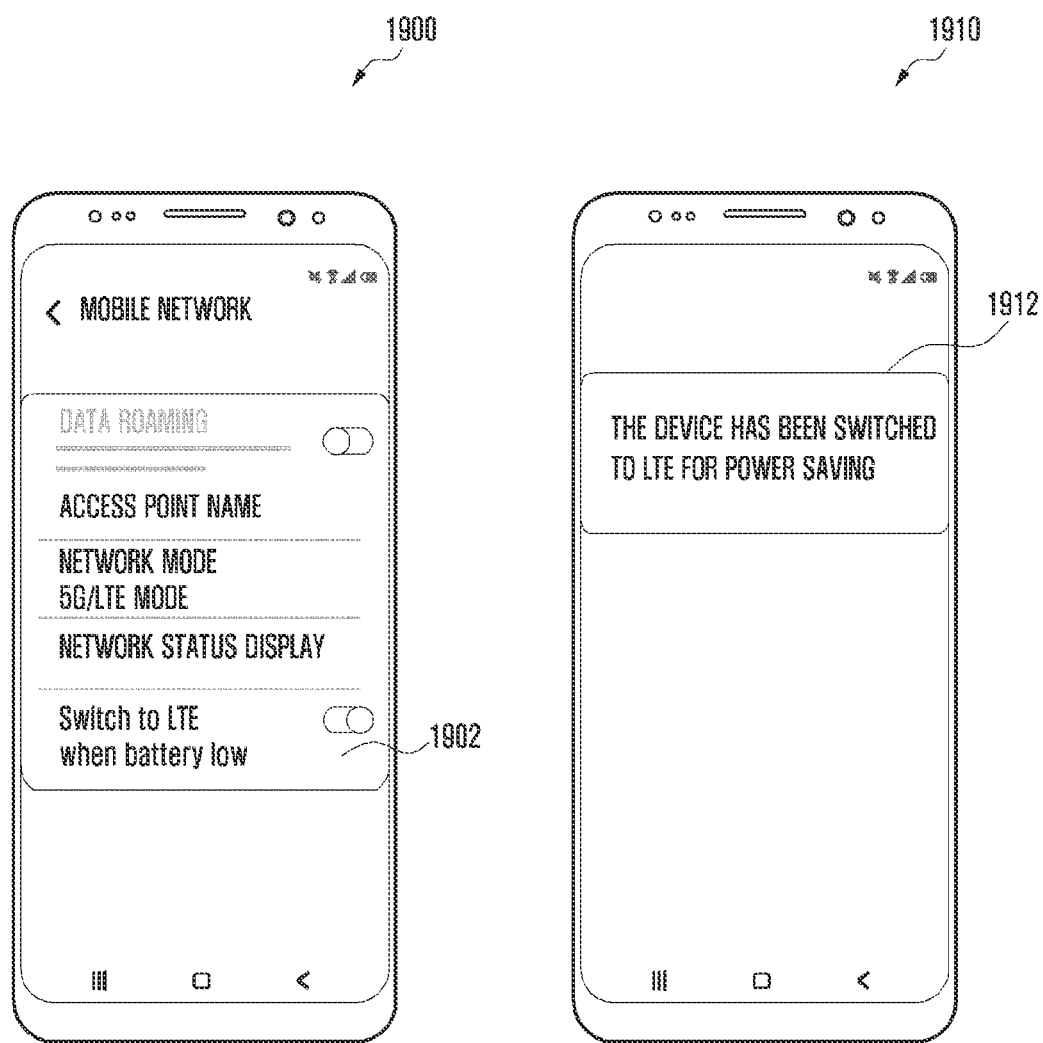
FIG. 19 illustrates the screen configuration of a network switching menu in an electronic device according to an embodiment of the disclosure.

FIG. 19 illustrates the screen configuration of a network switching menu in an electronic device according to an embodiment of the disclosure.

Referring to FIG. 19, the electronic device 101 may provide an LTE switch setup menu 1902 for setting whether to activate an LTE switch mode in a menu 1900 for managing a network for wireless communication. For example, the LTE switch mode may include a mode of handing over a network for wireless communication to reduce power consumption due to wireless communication.

When the LTE switch setup menu 1902 is set in an inactive state, the electronic device 101 may determine that a handover for reducing power consumption due to wireless communication is restricted.

When the LTE switch setup menu 1902 is set in an active state, the electronic device 101 may hand over a network for wireless communication, based on at least one of whether a display device 160 is activated, a data throughput, whether an application program associated with a first communication network is executed, the charge state (SoC) of a battery 189, or whether an external power source is connected. For example, when the electronic device 101 performs a handover to a second communication network (LTE mode), based on the charge state of the battery 189 while connected to the first communication network, the electronic device 101 may display information 1912 about the handover to the second communication network (e.g., 'The device has been switched to LTE for power saving') on the display device 160 (1910). For example, the information 1912 about the handover to the second communication network may be deleted from the display device 160 after a lapse of a certain time period or when a user input is detected.

According to various embodiments of the disclosure, an operating method of an electronic device 101 may include connecting to a first communication network among a plurality of communication networks supportable by the electronic device 101; determining whether to perform a handover to a second communication network, based on whether a display device 160 is activated and a data throughput, in a state of connection to the first communication network; and performing a handover to the second communication network when it is determined to perform the handover to the second communication network.

The determining whether to perform the handover may include determining to perform the handover to the second communication network when the display device 160 is deactivated and the data throughput is lower than a reference throughput.

The reference throughput may be set based on a use pattern of a user with respect to the electronic device 101, and the use pattern may be set based on at least one of a data usage per user collected for a reference time period, the data throughput, a use frequency of an application program, or an application program use time.

The determining whether to perform the handover may include determining to perform the handover to the second communication network when the display device 160 is deactivated and an application processor associated with the first communication network is not driven; and determining to perform the handover to the second communication network when the display device 160 is deactivated, the application processor associated with the first communication network is driven, and the data throughput is lower than the reference throughput The performing of the handover may include: identifying whether there is data transmitted and received through the first communication network when it is determined to perform the handover to the second communication network; identifying whether transmission and reception of data through the first communication network is completed when there is the data transmitted and received through the first communication network; and performing the handover to the second communication network when the transmission and reception of the data through the first communication network is completed.

The method may further include identifying a state of charge (SoC) of a battery 189; and performing the handover to the second communication network when the SoC of the battery 189 is lower than a reference level.

The determining whether to perform the handover may include determining whether to perform the handover to the second communication network, based on whether the display device is activated and the data throughput, when the SoC of the battery 189 is equal to or higher than the reference level.

The method may further include identifying whether the display device is activated when the handover to the second communication network is performed; and performing a handover to the first communication network when the display device is activated.

The first communication network may include a new radio (NR) communication network, and the second communication network may include a long-term evolution (LTE) communication network.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device configured to support a plurality of communication networks including a first cellular communication network and a second cellular communication network, the electronic device configured to:
   establish a first cellular connection with the first cellular communication network based at least in part on control information received from the second cellular communication network;
   perform first cellular communication with the first cellular communication network via the first cellular connection;

based at least in part on a determination that a display of the electronic device has been in an inactive state for a reference time period and that a data throughput detected in a state of the first cellular connection having been established is lower than a reference throughput:
   establish a second cellular connection with the second cellular communication network and perform second cellular communication with the second cellular communication network via the second cellular connection;
   release the first cellular connection with the first cellular communication network; and
   after the first cellular connection is released, determine that the display of the electronic device is activated, and based at least in part on a determination that the display of the electronic device is activated in a state of the second cellular connection having been established while performing the second cellular communication with the second cellular communication network:
   establish a third cellular connection with the first cellular communication network based at least in part on control information received from the second cellular communication network; and
   perform third cellular communication with the first cellular communication network via the third cellular connection.

2. The electronic device of claim 1, wherein the establishment of the second cellular connection with the second cellular communication network comprises establishment of a data channel for the second cellular connection with the second cellular communication network.

3. The electronic device of claim 1, wherein said release comprises transmitting a disconnection message for releasing a data channel for the first cellular connection with the first cellular communication network.

4. The electronic device of claim 1, further configured to:
   present, via the display, a setting menu to receive a user input to select a mode of performing second cellular communication and releasing the first cellular communication when the display of the electronic device has been in the inactive state for the reference time period and when the data throughput detected in the state of the first cellular connection having been established is lower than the reference throughput; and
   perform the performing of the second cellular communication further based on the user input received via the setting menu.

5. The electronic device of claim 1, further configured to:
set the reference throughput based at least in part on a use pattern by a user with respect to the electronic device, the use pattern including at least one of a data usage per user collected for a specified time period, the data throughput, a use frequency of an application program, or an application program use time.

6. The electronic device of claim 1,
   wherein the determination that the display has been in the inactive state for the reference time period and that the data throughput is lower than the reference throughput is made while data is transmitted or received via the first cellular connection as at least part of the first cellular communication, and
   wherein the electronic device is further configured to:
   identify whether there is data transmitted and received through the first cellular connection, and perform the performing of the second cellular communication only when transmission or reception of the data via the first cellular connection is completed.

7. The electronic device of claim 1, wherein the first cellular communication network forms at least part of a new radio (NR) communication network, and the second cellular communication network forms at least part of a long-term evolution (LTE) communication network.

8. The electronic device of claim 1, further configured to:
while the first cellular connection is released and the second cellular communication is performed via the second cellular connection, refrain from transmitting a data channel request to the first cellular communication network.

9. The electronic device of claim 8, wherein
while the first cellular connection is released and the second cellular communication is performed via the second cellular connection, the data channel request is refrained from being transmitted if a data throughput associated with the second cellular communication is lower than the reference throughput, and the second cellular connection is maintained with the second cellular communication network.

10. An operating method of an electronic device, the operating method comprising:
establishing a first cellular connection with a first cellular communication network among a plurality of communication networks supportable by the electronic device, based at least in part on control information received from a second cellular communication network among the plurality of communication networks;
performing first cellular communication with the first cellular communication network via the first cellular connection;
based at least in part on a determination that a display of the electronic device has been in an inactive state for a reference time period and that a data throughput detected in a state of the first cellular connection having been established is lower than a reference throughput:
establishing a second cellular connection with the second cellular communication network and performing second cellular communication with second cellular communication network via the second cellular connection;
releasing the first cellular connection with the first cellular communication network, and
after the first cellular connection is released, determining that the display of the electronic device is activated, and
based at least in part on a determination that the display of the electronic device is activated in a state of the second cellular connection having been established while performing the second cellular communication with the second cellular communication network:
establishing a third cellular connection with the first cellular communication network based at least in part on control information received from the second cellular communication network, and
performing third cellular communication with the first cellular communication network via the third cellular connection.

11. The method of claim 10, wherein the establishing the second cellular connection with the second cellular communication network comprises establishing a data channel for the second cellular connection with the second cellular communication network.

12. The method of claim 10, wherein said releasing comprises transmitting a disconnection message for releasing a data channel for the first cellular connection with the first cellular communication network.

13. The method of claim 10, further comprising:
presenting, via the display, a setting menu to receive a user input to select a mode of performing second cellular communication and releasing the first cellular communication when the display of the electronic device has been in the inactive state for the reference time period and when the data throughput detected in the state of the first cellular connection having been established is lower than the reference throughput; and
performing the performing of the second cellular communication further based on the user input received via the setting menu.

14. The method of claim 10, further comprising:
setting the reference throughput based at least in part on a use pattern of a user with respect to the electronic device,
wherein the use pattern includes at least one of a data usage per user collected for a specified time period, the data throughput, a use frequency of an application program, or an application program use time.

15. The method of claim 10,
wherein the determining that the display has been in the inactive state for the reference time period and that the data throughput is lower than the reference throughput is made while data is transmitted or received via the first cellular connection as at least part of the first cellular communication, and
wherein the method further comprises:
identifying whether there is data transmitted and received through the first cellular connection, and
performing the performing of the second cellular communication only when transmission or reception of the data via the first cellular connection is completed.

16. The method of claim 10,
wherein the first cellular communication network forms at least a part of a new radio (NR) communication network, and
wherein the second cellular communication network forms at least a part of a long-term evolution (LTE) communication network.

17. The method of claim 10, further comprising:
while the first cellular connection is released and the second cellular communication is performed via the second cellular connection, refraining from transmitting a data channel request to the first cellular communication network.

18. The method of claim 17, wherein, while the first cellular connection is released and the second cellular communication is performed via the second cellular connection, the refraining from transmitting the data channel request to the first cellular communication network comprises:
refraining from transmitting the data channel request to the first cellular refraining from transmitting the data channel request to the first cellular communication network if a data throughput associated with the second cellular communication is lower than the reference throughput, and maintaining the second cellular connection with the second cellular communication network.

19. A non-transitory computer-readable storage medium comprising instructions that, when executed by a computer, cause the computer to execute a method comprising:

establishing a first cellular connection with a first cellular communication network among a plurality of communication networks supportable by an electronic device, based at least in part on control information received from a second cellular communication network among the plurality of communication networks;

performing first cellular communication with the first cellular communication network via the first cellular connection;

based at least in part on a determination that a display of the electronic device has been in an inactive state for a reference time period and that a data throughput detected in a state of the first cellular connection having been established is lower than a reference throughput:
    establishing a second cellular connection with the second cellular communication network and performing second cellular communication with second cellular communication network via the second cellular connection;
    releasing the first cellular connection with the first cellular communication network; and
    after the first cellular connection is released, determining that the display of the electronic device is activated, and based at least in part on a determination that the display of the electronic device is activated in a state of the second cellular connection having been established while performing the second cellular communication with the second cellular communication network:
    establishing a third cellular connection with the first cellular communication network based at least in part on control information received from the second cellular communication network; and
    performing third cellular communication with the first cellular communication network via the third cellular connection.

\* \* \* \* \*